(12) United States Patent
Kim et al.

(10) Patent No.: US 12,324,959 B2
(45) Date of Patent: Jun. 10, 2025

(54) PUTTING GUIDE SYSTEM

(71) Applicant: VROTEIN INC., Seongnam-si (KR)

(72) Inventors: Chan Ki Kim, Seongnam-si (KR); Sung Hyun Mun, Gwangmyeong-si (KR)

(73) Assignee: VROTEIN INC., Seongnam-si (KR)

( * ) Notice: Subject to any disclaimer, the term of this patent is extended or adjusted under 35 U.S.C. 154(b) by 633 days.

(21) Appl. No.: 17/536,523

(22) Filed: Nov. 29, 2021

(65) Prior Publication Data

US 2022/0203166 A1      Jun. 30, 2022

(30) Foreign Application Priority Data

Dec. 31, 2020  (KR) .................. 10-2020-0189293
Nov. 22, 2021  (KR) .................. 10-2021-0161770

(51) Int. Cl.
| | | |
|---|---|---|
| *A63B 24/00* | (2006.01) | |
| *A63B 57/30* | (2015.01) | |
| *A63B 69/36* | (2006.01) | |
| *A63B 71/06* | (2006.01) | |
| *G06Q 50/10* | (2012.01) | |

(52) U.S. Cl.
CPC ........ *A63B 24/0021* (2013.01); *A63B 57/353* (2015.10); *A63B 69/36* (2013.01); *A63B 71/0622* (2013.01); *G06Q 50/10* (2013.01); *A63B 2024/0053* (2013.01); *A63B 2024/0056* (2013.01); *A63B 2220/12* (2013.01); *A63B 2220/18* (2013.01); *A63B 2220/20* (2013.01); *A63B 2220/806* (2013.01)

(58) Field of Classification Search
CPC .............. A63B 24/0021; A63B 57/353; A63B 69/36; A63B 71/0622; A63B 2024/0053; A63B 2024/0056; A63B 2220/12; A63B 2220/18; A63B 2220/20; A63B 2220/806; G06Q 50/10; G06T 2207/30224; G06T 7/246
See application file for complete search history.

(56) References Cited

U.S. PATENT DOCUMENTS 5,860,648 A * 1/1999 Petermeier .......... G07F 17/3297
                                                      273/371

FOREIGN PATENT DOCUMENTS

| CA | 2987916 C | * 10/2019 | ............. A63B 69/36 |
|---|---|---|---|
| JP | 2014508625 A | 4/2014 | |
| JP | 2017534374 A | * 11/2017 | |

(Continued)

*Primary Examiner* — Jeffrey S Vanderveen
(74) *Attorney, Agent, or Firm* — Dinsmore & Shohl LLP; Yongsok Choi, Esq.

(57) ABSTRACT

The present disclosure provides a putting guide system including at least one projector installed in an upper portion of a putting room including a floor surface composed of a putting field and capable of projecting an image onto the putting field, a camera located in the upper portion of the putting room near the at least one projector to capture an image of the putting field, a control module for providing physical property information of a putting environment based on the image provided from the camera to be analyzed and for controlling the projector, a server connected to the control module by wire/wireless to analyze a putting result and statistics and providing the analyzed result to a user terminal, and a user terminal for controlling the control module through a putting interface received from the server to perform a putting training program.

17 Claims, 13 Drawing Sheets

(56) References Cited

FOREIGN PATENT DOCUMENTS

| | | | |
|---|---|---|---|
| JP | 2018061729 | A | 4/2018 |
| KR | 1020090105279 | A | 10/2009 |
| KR | 100963492 | B1 | 6/2010 |
| KR | 100996245 | B1 | 11/2010 |
| KR | 101282319 | B1 | 7/2013 |
| KR | 1020150116323 | A | 10/2015 |
| KR | 101712838 | B1 | 3/2017 |
| KR | 101748233 | B1 | 6/2017 |
| KR | 1020180093703 | A | 8/2018 |
| KR | 1020180097838 | A | 9/2018 |
| KR | 101916604 | B1 | 11/2018 |
| KR | 101951336 | B1 | 2/2019 |
| KR | 1020200085803 | A | 7/2020 |
| KR | 102148254 | B1 | 8/2020 |
| KR | 102154611 | B1 | 9/2020 |

\* cited by examiner

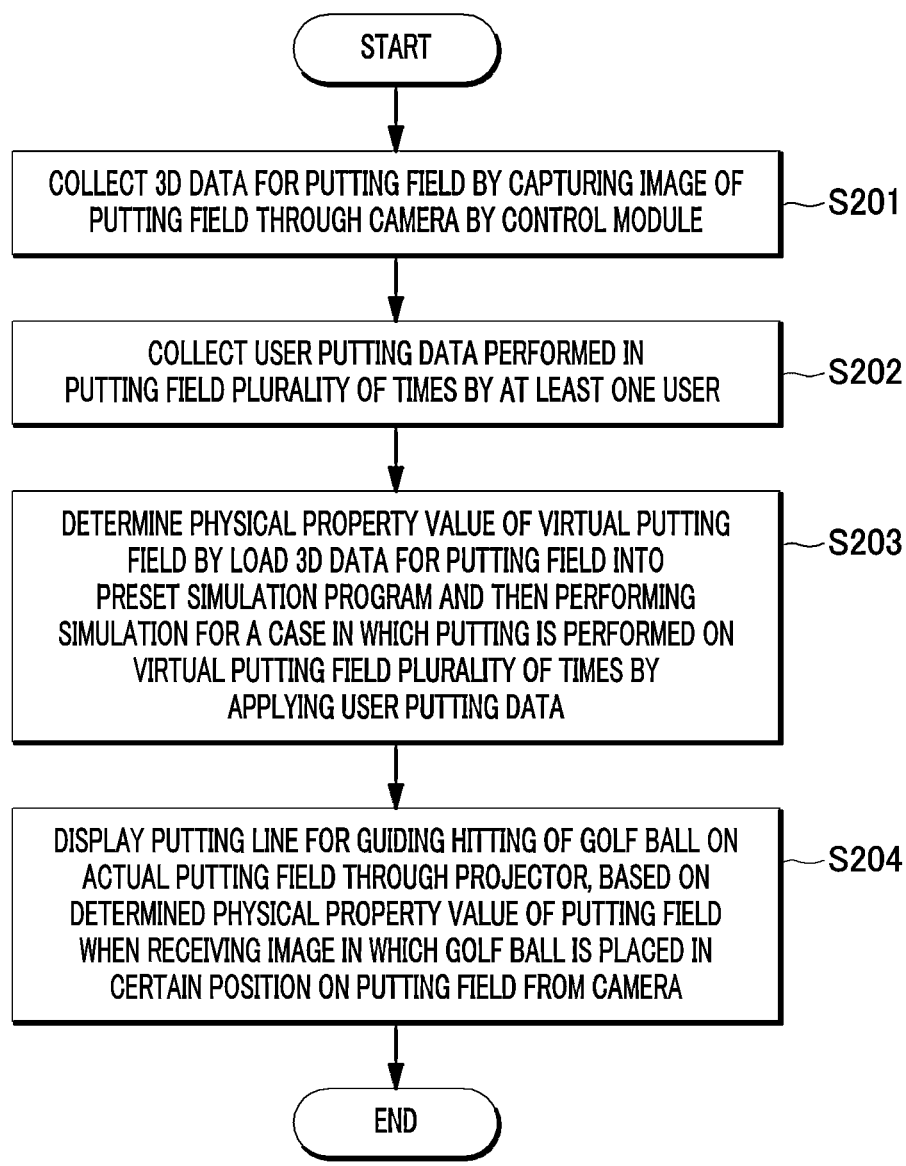

PUTTING GUIDE SYSTEM

CROSS-REFERENCE TO RELATED APPLICATION

This application claims priority to Korean Patent Application No. 10-2020-0189293 filed on Dec. 31, 2020 and Korean Patent Application No. 10-2021-0161770 filed on Nov. 22, 2021, the entire contents of which are herein incorporated by reference.

BACKGROUND

1. Field

The present disclosure relates to a putting guide, and more particularly, to a system and a method for providing a guide image to a putting field by providing putting practice through equipment provided indoors, providing a user interface showing statistical data, and simulating putting by constructing a three-dimensional (3D) simulation environment similar to a putting field in a real environment.

2. Description of the Related Art

The trend of general sports lectures is education based on statistics using data, and instead of delivering an instructor's know-how or exercise method, the focus is on providing customized education by analyzing a student's data, sports lectures using e-learning technologies such as augmented reality (AR), virtual reality (VR), and mixed reality (MR) are emerging as a trend.

In particular, golf is sports in which victory is largely determined by individual capabilities when swinging or putting and is suitable for improving skills by correcting a posture or a hitting habit and improving a shot group.

However, golf is basically field sports and is conducted outdoors, and thus, there are many conditions to consider when training.

Screen golf is mainly used in the existing indoor golf training. Screen golf is for providing the feeling of training in the real field by installing a screen on a wall of a training space and sending a virtual simulation screen to a screen, and is not suitable for analyzing a ball trajectory or correcting putting.

Accordingly, there is a need for a technology capable of providing an environment similar to a real field through a virtual simulation during indoor training and providing the same effect as training in the real field even indoors.

SUMMARY

The present disclosure is to help a user conduct a systematic putting training by providing a putting guide system and physical property information of a virtual putting environment utilized in the putting guide system and providing a more accurate virtual putting environment during putting training, and by identifying a user's putting action, habits, and improvement points to suggest in the form of numerical statistics during a user's putting training.

In addition, by collecting information on putting that a plurality of users performed before or will perform in the future to use for updating for a virtual putting environment, putting actions, habits, and improvement points of various users are identified and displayed on a putting field, and the users may perform systematic putting training.

Additional aspects will be set forth in part in the description which follows and, in part, will be apparent from the description, or may be learned by practice of the presented embodiments.

According to an aspect of an embodiment, a method of providing a putting guide system includes (a) Distinguishing a golf ball on a putting field from other objects by collecting images captured by a camera by a control module; (b) Tracking a trajectory of the golf ball by analyzing the collected images by the control module when a user hits the golf ball; and (c) Projecting the trajectory of the golf ball onto the putting field for a user to view the trajectory under a control of a projector controlled by the control module, wherein the putting guide system may include at least the projector installed in an upper portion of the putting room including a floor surface composed of the putting field and capable of projecting an image onto the putting field, the camera located in the upper portion of the putting room near the at least one projector to capture the image of the putting field, the control module for providing physical property information of a putting environment based on the image provided from the camera to be analyzed and for controlling the projector, a server connected to the control module by wire/wireless to analyze a putting result and statistics and providing the analyzed result to a user terminal, and the user terminal for controlling the control module through a putting interface received from the server to perform a putting training program.

In addition, the step (a) may include (a+1) Identifying a difference by comparing a reference image for the putting field with the captured images when the golf ball is placed on the putting field; (a+2) Distinguishing the golf ball from a person and an object other than the golf ball; and (a+3) Checking a region other than the golf ball.

In addition, in the step (a+1), the golf ball may be identified by capturing an image of a corresponding state by the camera and providing the captured image to the control module when the user puts down the golf ball and by comparing the image received by the control module with the reference image which is the image captured by the camera before the user enters the putting room to recognize parts different from the reference image on the received image based on a color and a size.

In addition, in the step (a+2), when a plurality of objects having a color corresponding to a color of the golf ball are recognized in the image captured in real time, the control module may distinguish the golf ball based on a color, a size of the recognized object, and a movement of the recognized object, and when it is determined that the size of the object is greater than a preset size or the movement of the recognized object is different from a physical movement pattern in which the golf ball is movable, the control module may recognize that the recognized object is at least one of a person's shoes, hat, and clothing and determines that the recognized object is not the golf ball.

In addition, in the step (a+3), the golf ball may be distinguished from the region other than the golf ball by collectively masking the rest other than the golf ball in a color or pattern distinguished from the golf ball.

In addition, in the step (b), when the user hits the golf ball, the control module may compare the images received from the camera for each time period, calculate a feature vector including a movement direction and a speed of the golf ball, predict the trajectory of the golf ball by calculating change values for each time period of the feature vector, determine whether the golf ball enters the hole cup based on the predicted trajectory, and determine whether to continuously track the trajectory of the golf ball in a path through which the golf ball passes by the hole cup when the golf ball approaches the hole cup and the golf ball overlaps the hole cup overlap each other to be identified as one object having one color in the captured image.

In addition, in the step (c), a trajectory image of the golf ball may be projected onto the putting field in real time after the step (b), or when there is an input from the user terminal after the step (b), the trajectory image of the golf ball may be projected onto the putting field.

In addition, the method may further include (a-1) Providing, to the user terminal, a pattern test UI that enables putting training and result check for each of a plurality of regions constituting a putting guide image displayed on the putting field before the step (a); (a-2) Providing, to the user terminal, a training UI that enables putting and the result check by causing the user to optionally set a position and an aim point of the golf ball before the step (a); (a-3) Displaying a position where the golf ball is placed on the putting field under the control of the control module according to an input from a user terminal, between the step (a-1) and the step (a); and (a-4) Providing a pattern test result view user interface after the step (a) to the step (c) are performed.

In addition, the step (a-1) may further include inputting a pattern test condition including starting point determining, distance order determining, direction order determining, and stroke limit time setting.

In addition, the pattern test result view user interface may be configured by including a success rate display image that has a form of a dart board and is composed of shapes and colors that is easily identifiable by using green and red which are complementary to each other and includes division information of the putting field to display a training result, and a training result table provided in a form of a list including a date, attempted putting, unsuccessful putting, and a success rate, on the right side of the success rate display image; and a result view button.

In addition, a result view GUI may be displayed when clicking the result view button and include putting section images obtained by equally dividing the putting field for each angle and dividing into different lengths depending on distances from the hole cup, and a putting success identifier and a putting failure identifier may be displayed in the respective putting section images, the user terminal may transmit information on the putting success identifier and the putting failure identifier to the control module, the control module may project the putting success identifier and the putting failure identifier onto the putting field through the projector, the putting failure identifier and the putting success identifier may be configured in different shapes, and when the putting failure identifier and the putting success identifier are clicked, a putting trajectory of corresponding putting may be simultaneously provided to the putting field and the putting field image on the user terminal through the user terminal and the projector by the control module.

In addition, the training UI may include a ball position designation interface, an aimpoint interface, and a putting line interface, the aim point may indicate a position at which the user looks at a target point to put the golf ball into the hole cup, and the putting line may connect the aim point to a current position of the golf ball and is resettable in a different direction by the user.

In addition, the ball position designation interface may include a putting field image region and a ball position setting region, the putting field image region has a shape in which divided polygons are displayed on a green background, respective putting fields are equally divided, the ball position setting region is located between the divided polygons and sets a position of the golf ball to be placed on the putting field, and the ball position designation region set by the control module is projected onto the putting field through the projector, the aimpoint interface may indicate that the control module automatically displays the aimpoint on the putting field image according to own algorithm after the ball position designation interface, and the putting line interface may provide the putting line to project a preset line image on the putting field.

In addition, in the training time breaking line success rate analysis table, a two-dimensional plane may be divided into eight regional regions according to a position where putting is performed, and a success rate for each region may be provided in a form of a graph, an x axis of the graph denotes date, a y axis of the graph denotes the success rate, respective sections may be indicated by different lines, the section success rate for each conditional date are analyzed and provided in the form of the graph, the breaking line may be divided into eight stages according to the inclination, and the success rate for each date and each breaking line may be provided in a form of a line graph by different colors for each breaking line, the shot group analysis table may provide a position in which the golf ball stops after the putting, as two-dimensional coordinates, and an x axis and a y axis divide the putting field into 1, 2, 3, and 4 quadrants to indicate the position in which the golf ball stops in each quadrant, a size of the putting field may be set based on the golf ball stopped at the farthest place among the displayed positions in which putting-failed golf balls stop in the shot group analysis table, a color of the golf ball hit within a corridor range and a color of the golf ball hit outside the corridor range may be distinguished from each other and displayed on two-dimensional coordinates, the corridor may refer to a putting angle at which the golf ball has to be putted to enter the hole cup when putting is performed toward the hole cup at a position, and when an identification mark indicating the golf ball in the shot group analysis table is input by the user, a shot group ball tracking UI is provided, and the identification mark indicating a golf ball selected by the user may provide a selection region indicating a quadrant located in the shot group analysis table, a selection region ball information display image, and a path check button, and when the path check button is clicked, the trajectory of the golf ball of putting performed at a position corresponding to the identification mark indicating the golf ball selected by the user may be provided on the user terminal and the putting field.

In addition, a putting section image obtained by dividing the putting field into a plurality of sections equally for each angle around the hole cup may be displayed by the projector, a putting success rate of each section may be provided to the user terminal after the user performs putting for each section, and at least two or more sections among the plurality of sections may have different inclinations, position information after putting of the golf ball hit through the user terminal may be provided as an image in a form of a map after the user performs putting, and when the putting is performed toward the hole cup from a position, information on whether the golf ball is hit within a corridor range may be identified in the image in the form of the map according to the corridor range which is a putting angle range for putting the ball into the hole cup.

In addition, the method may further include (e) Generating a physical property information of a putting environment utilized in a putting guide system before the step (a), wherein the step (e) may include (e-1) Collecting, by the control module, 3D data for the putting field by capturing an image of the putting field through the camera; (e-2) Collecting, by the control module, user putting data performed a plurality of times by at least one user in the putting field; and (e-3) Loading the 3D data for the putting field into a preset simulation program by the control module, and then determining a physical property value of the putting field while performing the simulation a plurality of times, when the putting is performed on the putting field by applying the user putting data, the step (a) may include displaying a putting line for guiding hitting of the golf ball on the putting field through the projector based on the determined physical property value of the putting field, when the control module receives an image of the golf ball placed at a position on the putting field from the camera, and the physical property value may include a friction force and inclination of the putting field.

In addition, in the step (e-1), the camera may provide the 3D data obtained by capturing images of the putting field for each preset height unit to the control module, an object may be recognized based on an HSV value and a size of the object after the 3D data is provided, and when the recognized object is determined to deviated from a surrounding inclination, a mark is displayed on the 3D data for the putting field to display the recognized object in a different color on the 3D data, the 3D data may be corrected by performing noise filtering based on a Gaussian filter and the surrounding inclination, and the corrected 3D data is for identifying only a position and a size of the golf ball on the putting field, the user putting data may be data collected every time each user performs putting on the putting field and is configured in a form of the corrected 3D data and includes coordinate values of the golf ball, a corridor range, a speed of the golf ball, a putting time, and user identification information, and the simulation program may be physical engine software implemented to equally apply a physical law of the real world to virtual reality.

In addition, the step (e-2) may include extracting, from the user putting data, putting start data including a position of the golf ball, a hitting direction, and a hitting force, and putting result data including the trajectory of the golf ball and whether the golf ball is put in the hole cup; and adjusting the physical property value of the simulation program to output corresponding putting result data when the putting start data of the user putting data is input to the simulation program, the hitting force may be derived by calculating an initial velocity at the time of performing the putting with reference to position values for each time period after the golf ball is hit.

In addition, the step (e-3) may include updating the determined physical property value by repeating the step (a) to the step (c) every preset period and deriving greatest and smallest ranges of the putting angle and an ideal putting angle by performing the simulation multiple times while variously changing values for a hitting direction and a hitting force when a value for a position of the golf ball is input, a simulation may be performed by inputting the value for the position of the golf ball in the image to the simulation program and then a trajectory for the golf ball to enter the hole cup is found, and the putting line is displayed on the putting field based on the trajectory, the ideal putting angle may be an average value of the greatest and smallest ranges of the putting angle, the putting line corresponding to each of a greatest putting angle, a smallest putting angle, and an ideal putting angle on the putting field is displayed on the putting field.

According to an aspect of another embodiment, a putting guide system server includes a memory storing a program for performing a putting guide system and a method of providing physical property information utilized in the putting guide system; and a processor configured to execute the program, wherein the method includes (a) Distinguishing a golf ball on a putting field from other objects by collecting images captured by a camera by a control module; (b) Tracking a trajectory of the golf ball by analyzing the collected images by the control module when a user hits the golf ball; (c) Projecting the trajectory of the golf ball onto the putting field for a user to view the trajectory under a control of a projector controlled by the control module; (d) Transmitting member information and a training period to the server by the user terminal, and collecting and analyzing, by the server, information on a putting result performed by the user during a corresponding period with reference to user identification information and the training period, and providing the user terminal with statistical UI including training data related to the training period, a success rate, success rate analysis information for each distance, a training time breaking line success rate analysis table, and a shot group analysis table; and (e) Providing physical property information of a putting environment utilized in the putting guide system.

BRIEF DESCRIPTION OF THE DRAWINGS

These and/or other aspects will become apparent and more readily appreciated from the following description of the embodiments, taken in conjunction with the accompanying drawings in which:

FIG. 15 is a flowchart illustrating a method of providing physical property information of a putting environment utilized in a putting guide system, according to an embodiment of the present disclosure.

DETAILED DESCRIPTION

Figure 1:
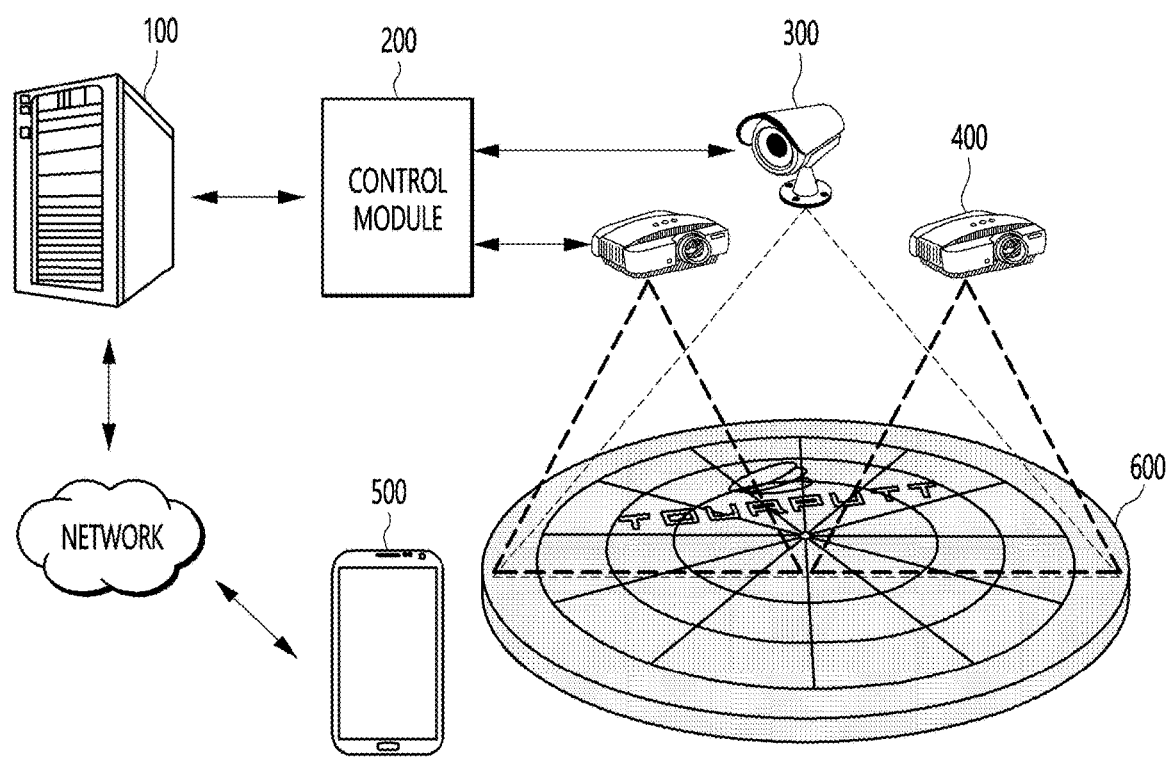
FIG. 1 is an example configuration diagram illustrating a putting guide system according to an embodiment of the present disclosure.

Hereinafter, embodiments of the present disclosure will be described in detail with reference to the accompanying drawings such that those skilled In the technical field to which the present disclosure belongs may easily implement the present disclosure. However, the present disclosure may be embodied in several different forms and is not limited to the embodiments described herein. In addition, in order to clearly describe the present disclosure in the drawings, parts irrelevant to the description are omitted, and similar reference numerals are attached to similar parts throughout the specification.

Throughout the specification, when a part is "connected" to another part, this includes not only a case of being "directly connected" but also a case of being "electrically connected" with another element interposed therebetween. In addition, when a part "includes" a certain component, it means that other components may be further included therein, rather than excluding other components, unless otherwise stated.

In the present specification, a "portion" includes a unit implemented by hardware, a unit implemented by software, and a unit implemented by using both. In addition, one unit may be implemented by using two or more pieces of hardware, and two or more units may be implemented by one piece of hardware. Meanwhile, "~portion" is not limited to software or hardware, and "~portion" may also be configured to be in an addressable storage medium or may also be configured to reproduce one or more processors. Thus, in one example, "~portion" includes components such as software components, object-oriented software components, class components, and task components and includes processes, functions, properties, procedures, subroutines, segments of a program code, drivers, firmware, a microcode, a circuit, data, a database, data structures, tables, arrays, and variables. The functions provided in components and "~portions" may be combined into a smaller number of components and "~portions" or may be further separated into additional components and "~portions". In addition, components and "~portions" may also be implemented to play one or more central processing units (CPUs) in a device or a secure multimedia card.

A "user terminal" referred to below may be implemented as a computer or portable terminal that may access a server or another terminal through a network. Here, the computer may include, for example, a notebook computer equipped with a web browser, a desktop computer, a laptop computer, a virtual reality (VR) head mounted display (HMD) (for example, HTC Vive, Oculus Rift, GearVR, DayDream, PSVR, and so on), and so on. Here, the VR HMD includes all standalone models (for example, Deepon, PICO, and so on) and so on implemented independently of a VR HMD for a personal computer (PC) (for example, HTC VIve, Oculus Rift, Fove, Deepon, etc.), a VR HMD for mobile (for example, GearVR, DayDream, Storm Horse, Google Cardboard, and so on), and a VR HMD for console (PSVR). A portable terminal is, for example, a wireless communication device that guarantees portability and mobility and includes not only a smartphone, a tablet PC, a wearable device, but also various devices equipped with communication modules such as Bluetooth (Bluetooth low energy (BLE)), near field communication (NFC), radio frequency identification (RFID), Ultrasonic, Infrared, Wi-Fi, LiFi, and so on. In addition, a "network" refers to a connection structure capable of exchanging information between respective nodes such as terminals and servers, and includes a local area network (LAN), a wide area network (WAN), the Internet (WWW: world wide web), wired and wireless data communication networks, a telephone network, wired and wireless television networks, and so on. Wireless data communication networks include, for example, 3rd generation (3G), 4G, 5G, 3rd generation partnership project (3GPP), long term evolution (LTE), world interoperability for microwave access (WIMAX), Wi-Fi, Bluetooth communication, infrared communication, ultrasound communication, visible light communication (VLC), LiFi, and so on, but are not limited thereto.

A method of providing a putting guide system according to an embodiment of the present disclosure may be provided in a space where putting training is performed indoors or outdoors.

The present disclosure provides a system that tracks a trajectory of a golf ball putted by a user, provides the trajectory to the user, and proposes a projection image displayed on a putting interface of a user terminal 500 and a putting field 600, and thus, the user may perform correct putting. To this end, a function of automatically recognizing a golf ball, tracking a trajectory of the golf ball, and showing the trajectory may be a core function. In this case, the core function is performed by a control module 200.

Referring to FIG. 1, components of a method of providing a putting guide system, according to an embodiment of the present disclosure will be described.

The method of providing a putting guide system, according to an embodiment of the present disclosure includes a server 100, a control module 200, a camera 300, a projector 400, a user terminal 500, and a putting field 600. The projector 400, the camera 300, and the user terminal 500 may be provided in a putting room. The putting field 600 may indicate a floor surface of the putting room.

Figure 2:
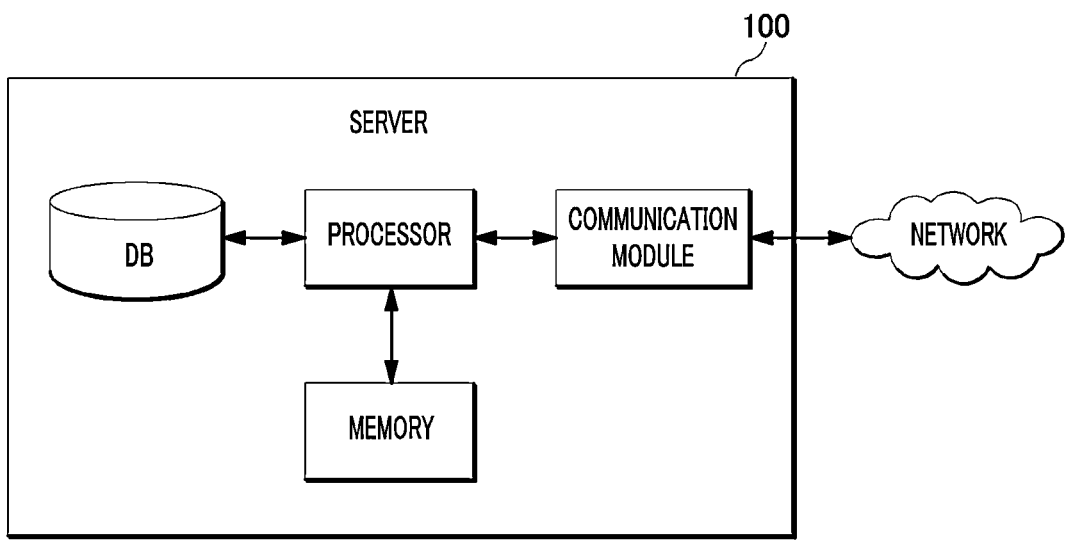
FIG. 2 is an example configuration diagram of a server according to an embodiment of the present disclosure.

Referring to FIG. 2, the server 100 may be connected to the control module 200 and the user terminal 500 through a wired or wireless communication network and may provide a putting interface to the user terminal 500.

The control module 200 may be connected to the server 100, the camera 300, and the projector 400. In this case, the control module 200 may receive a putting field image from the camera 300 and transmit the putting field image to the server 100 and may provide a putting guide image to the putting field 600 through the projector 400.

The camera 300 may be located in an upper portion of the putting room near at least one projector 400 to capture the putting field image and provide the captured putting field image to the control module 200 and the server 100.

The projector 400 is installed in an upper portion of a putting room including a floor surface on which the putting field 600 is configured, and a predetermined image provided from the control module 200 may be projected onto the putting field 600. In this case, one or more projectors 400 may be installed.

In this case, the projector 400 may divide the putting field 600 into a plurality of regions and project images thereon.

For example, when two projectors 400 are installed, the two projectors 400 project images onto rectangular regions obtained by dividing the putting field 600 into two regions, but the respective regions may be projected so as not to overlap each other.

The user terminal 500 may receive a putting interface from the server 100 and execute a putting training program.

Hereinafter, a function of the control module 200 and each component will be described in detail.

Figure 3:
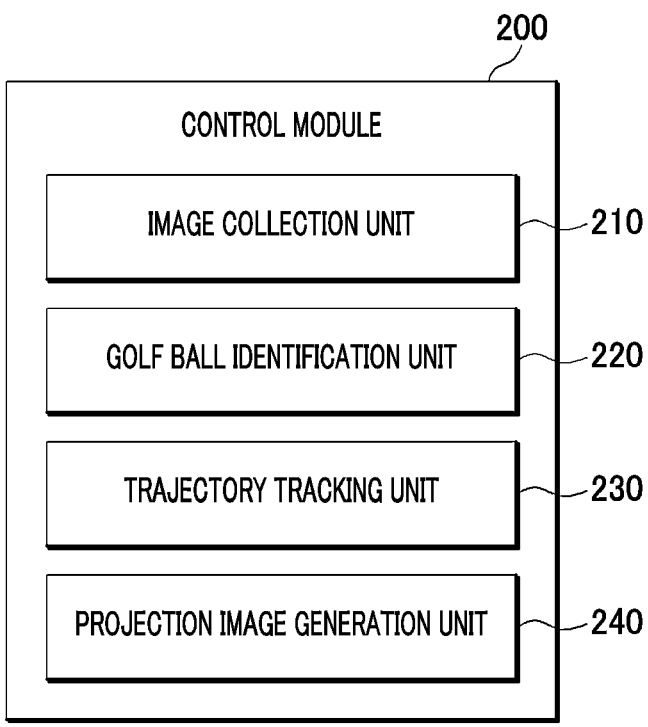
FIG. 3 is an example diagram of an internal configuration of a control module according to an embodiment of the present disclosure.

Referring to FIG. 3, the control module 200 may include an image collection unit 210, a golf ball identification unit 220, a trajectory tracking unit 230, and a projection image generation unit 240.

The image collection unit 210 may collect a reference image which is an image of a putting room captured by the camera 300 before a user enters the putting room, and an image of a putting room captured by the camera 300 after the user enters the putting room.

The golf ball identification unit 220 may compare the image received by the control module 200 with the reference image, recognize as difference between the reference image and the received image, based on a color and a size, thereby identifying a golf ball.

When the golf ball identification unit 220 recognizes a plurality of objects having a color corresponding to a color of a golf ball from the captured image taken in real time, the control module 200 may distinguish the golf ball based on the type of color of the recognized object, a size of the recognized object, and a movement of the recognized object.

In this case, when it is determined that the size of the object is larger than a preset size or that the movement of the recognized object is different from a physical movement pattern that the golf ball may move, the control module 200 determines that the object is a user's shoes, hat, or clothing, thereby determining that the object is not a golf ball.

For example, when a user wears a white hat, the white hat may move back and forth according to the user's preparation motion. However, since the golf ball cannot have such a physical movement pattern that moves back and forth, the golf ball identification unit 220 of the control module 200 may determine that the white hat worn by the user is not a ball.

In addition, by performing masking in which the remaining parts except for the golf ball are collectively processed as a color or pattern distinguished from the golf ball, an operation of distinguishing the golf ball from a non-golf ball region may be performed.

When a user hits a golf ball, The trajectory tracking unit 230, the trajectory tracking unit 230 may calculate a feature vector including a movement direction and a speed of the golf ball by comparing images for each time period that the control module 200 received from the camera 300 and may predict a trajectory of the golf ball by calculating a change value of the feature vector for each time period, In addition, the control module 200 may receive an image in which a hole cup overlaps a golf ball overlap as one. In this case, there may be two cases below, and it is necessary to determine a tracking continuation by predicting a trajectory of a ball in advance through the feature vector.

In a first case, it is predicted that a color of a golf ball is the same as a color of a hole cup and the golf ball will enter the hole cup when a feature vector value of the golf ball is analyzed.

In this case, when the control module 200 receives an image in which the golf ball approaches the hole cup such that the color of the golf ball overlaps the color of the hole cup, the control module 200 may analyze the feature vector value of the golf ball and stop tracking when it is determined that the golf ball enters the hole cup.

In a second case, the color of the golf ball is the same as the color of the hole cup, and when the feature vector value of the golf ball is analyzed, it is predicted that the golf ball does not enter the hole cup.

In this case, even when the control module 200 receives an image in which the golf ball approaches the hole cup such that the color of the golf ball overlap the color of the hole cup, it is also possible to determine in advance that the golf ball will not enter the hole cup based on a result of analyzing the feature vector value of the golf ball.

Accordingly, tracking may continue until movement of a golf ball is no longer observed by determining that the golf ball is just adjacent to the hole cup and does not pass by the hole cup or does not reach the hole cup.

As described above, the control module 200 determines whether the golf ball enters the hole cup based on the predicted trajectory and continuously tracks the trajectory of the golf ball, and when it is determined that the golf ball is inside the hole cup or stops moving, the control module 200 may stop tracking the tracking.

The projection image generation unit 240 generates a trajectory image of a golf ball to be projected onto the putting field 600 in real time after tracking. In this case, the projection image generation unit 240 may receive an input from the user terminal 500 and transmit a command for projecting the trajectory image of the golf ball onto the putting field 600 to the projector 400.

In this case, a case in which a command to project a trajectory image of a golf ball onto the putting field 600 is transmitted to the projector 400 by the control module 200 may be divided into the following two cases.

A first case is a case in which putting that a user made immediately before is displayed.

In this case, the control module 200 analyzes an image received from the camera 300 in real time and generates an image to be projected onto the putting field 600 by using the projection image generation unit 240. The control module 200 transmits an image to be projected onto the projector 400 at the same time as the tracking of the golf ball is stopped, and the projector 400 projects the image to the putting field 600.

A second case is a case in which an input of the user terminal 500 is received and displayed.

As the user terminal 500 manipulates the putting interface, putting that a user made immediately before or a trajectory of the previous putting may be projected onto the putting field 600.

In this case, the control module 200 analyzes the image received immediately before or received previously from the camera 300, and the projection image generation unit 240 generates a projection image of the putting selected by a user.

Thereafter, an image to be projected is transmitted to the projector 400 according to an input of the user terminal 500, and the projector 400 projects the image onto the putting field 600.

Meanwhile, a putting interface of the user terminal 500 may provide two training modes and statistics. The two training modes include a pattern test and a training mode.

The pattern test is putting training for balls placed at a plurality of positions on the inclined putting field 600 and is to find out a user's putting pattern when a user makes putting within a required time in a state in which a preset putting starting point is projected onto the putting field 600 through the projector 400.

Here, a degree of inclination of the putting field 600 may be preset for each region in the putting field 600. Alternatively, a user may also adjust the degree of inclination for each region whenever the user putts according to desired conditions by configuring a mechanical auxiliary device under the putting field 600 so as to be adjusted by a user terminal or a control module.

The training mode may set a plurality of elements required for putting training and is to provide customized putting training to a user through the setting.

In this case, the core function of the above-described control module 200 may be commonly utilized for the pattern test and training mode.

Hereinafter, the pattern test will be described in detail with reference to FIGS. 4 to 6.

Figure 4:
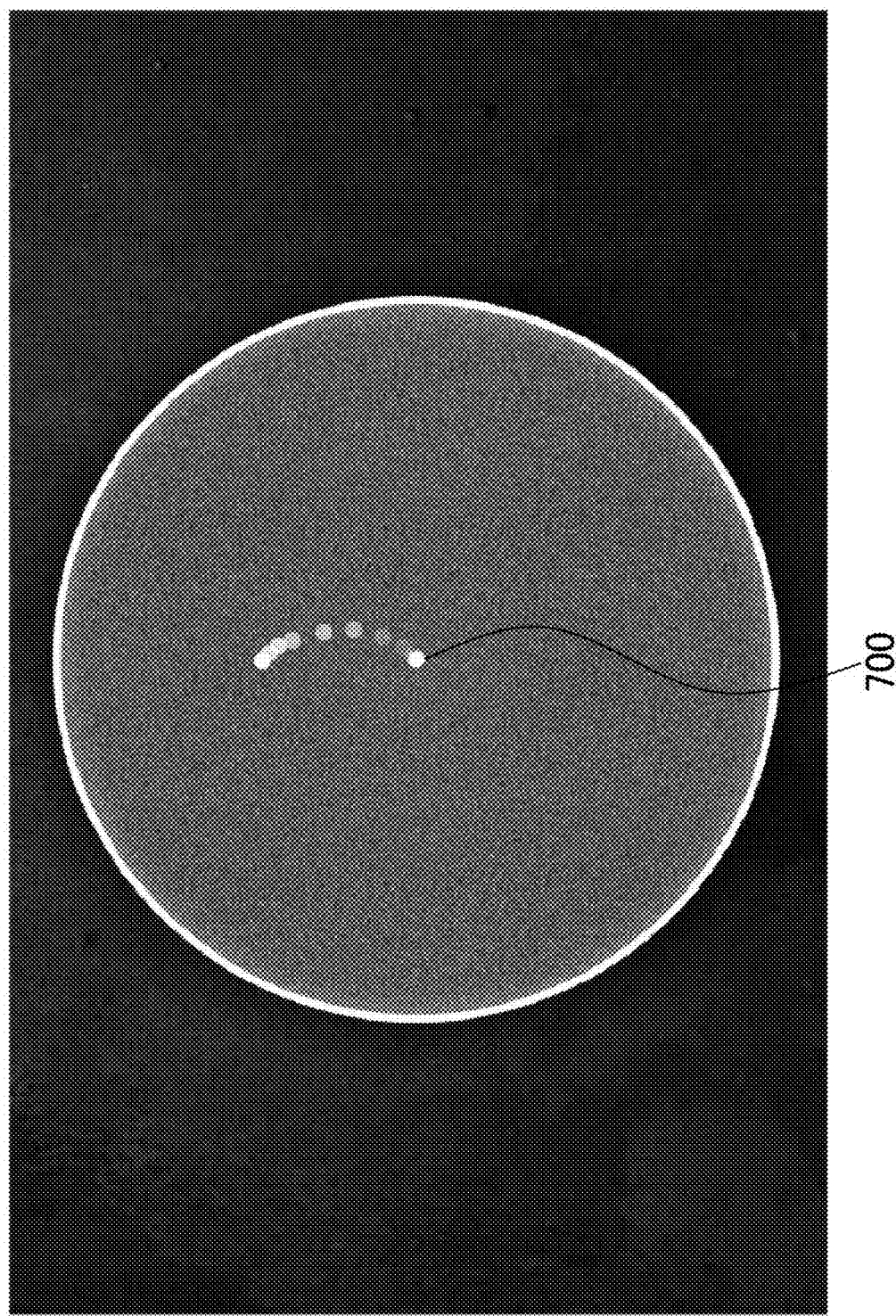
FIG. 4 is an example view of a putting field image and a golf ball graphical user interface (GUI) according to an embodiment of the present disclosure.

Referring to FIG. 4, a putting interface provided to the user terminal 500 may include a putting field GUI and a golf ball GUI. In this case, the putting field GUI may be in a form filled with green grass texture in a circular shape similar to the shape of the putting field 600, and the golf ball GUI may be in a form filled with white texture in a small circle similar to an actual golf ball.

Hereinafter, a case in which a user performs the pattern test will be described in detail.

When a user selects a pattern test item from a main menu, an interface for inputting conditions for a pattern test to be performed through the user terminal 500 may be provided.

In this case, a user inputs starting point determining, distance order determining, direction order determining, and stroke limit time setting, and the user terminal 500 transmits the received setting values to the server 100.

Thereafter, the server 100 provides a description image of a pattern test progress screen to the user terminal 500. The description image of the pattern test progress screen may identify and display a region to be putted on a circular putting field image.

Thereafter, the control module 200 proceeds with a putting system according to a condition input. The control module 200 designates a position in which a golf ball is put down and projects a putting field guide image onto the putting field 600 through the projector 400.

The putting field guide image is an image that is generated by the projection image generation unit 240 of the control module 200 and projected onto the putting field 600 by the projector 400, and is an image related to a preset guide for putting training or an image to help with putting training provided according to the user's setting.

When a user puts down a golf ball, the control module 200 checks that the golf ball is located at the designated position and performs masking by distinguishing the golf ball from a non-ball.

The control module 200 transmits coordinate information of a golf ball to the user terminal 500 and displays a golf ball image in a region corresponding to an actual position of the golf ball on a putting field GUI of a putting interface provided to the user terminal 500.

The control module 200 compares and analyzes images captured by the camera 300 and projects a trajectory image of a golf ball onto the putting field 600 through the projector 400 or projects the trajectory image onto the putting field 600 after a preset time, and when the control module 200 determines that the ball stops or enters the hole cup, the control module 200 stops tracking, calculates coordinate values of the trajectory of the golf ball and stores the coordinate values and provides the coordinate values to the server 100. The operation of the control module 200 is performed in the same way as the function of the control module 200 described above, and thus, redundant descriptions thereof are omitted without being repeated.

When the operation of the pattern test is completed, a user may be provided with a pattern test result view.

Figure 5:
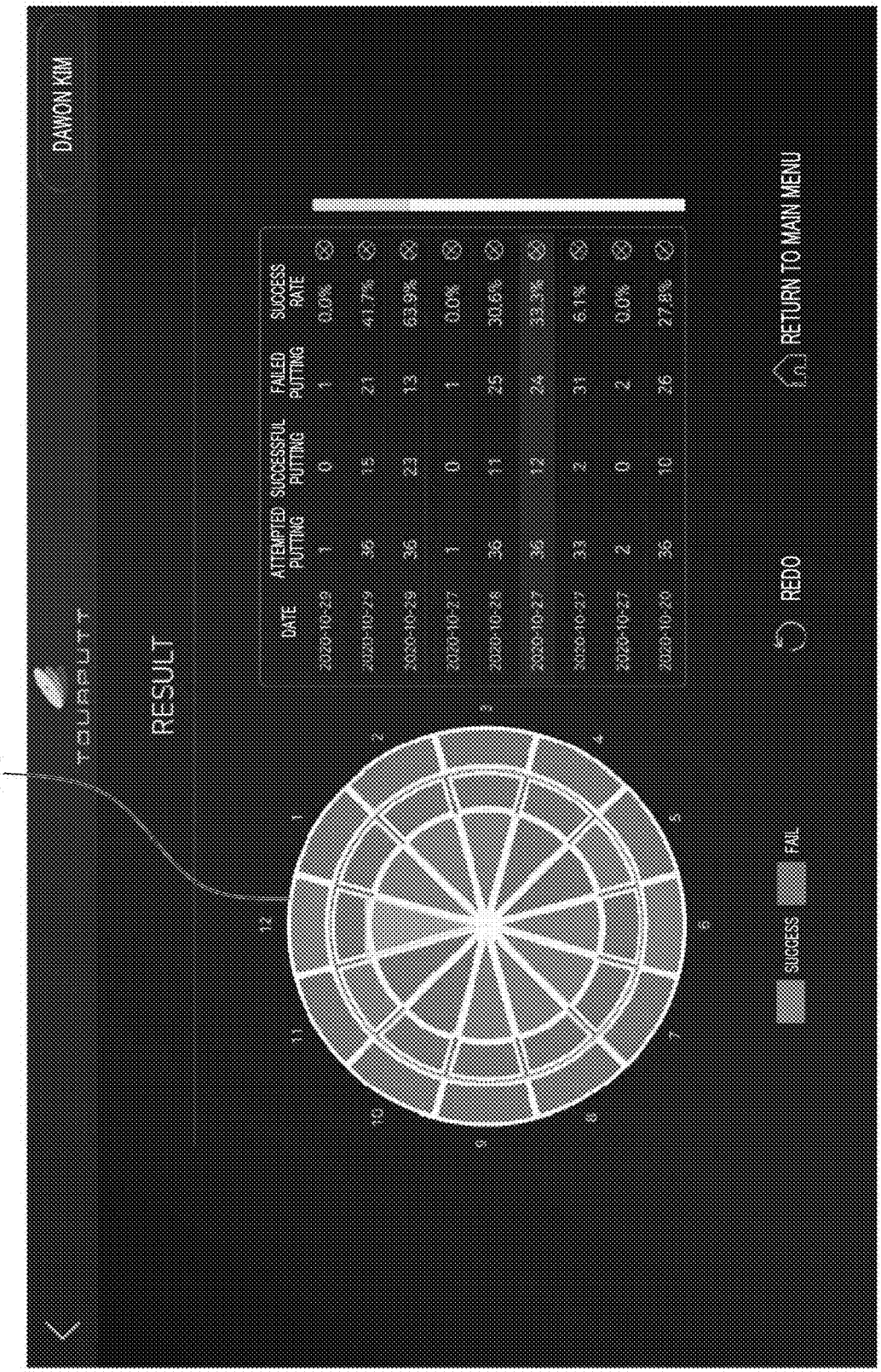
FIG. 5 is an example view illustrating a pattern test result view according to an embodiment of the present disclosure.

Referring to FIG. 5, the pattern test result view may provide a success rate display image 710, a training result table, a result view operation button, a delete operation button, a redo button, and a return-to-main-menu button.

The success rate display image 710 has a form of a dart board and is composed of shapes and colors that may be easily identified by using green and red which are complementary to each other, and includes division information of the putting field 600, thereby displaying training results.

The training result table may be provided in the form of a list including a date, an attempted putting, an unsuccessful putting, and a success rate, on the right side of the success rate display image 710.

In this case, a putting field GUI may be provided to the user terminal 500 when the result view operation button is selected, and when the user terminal 500 transmits a result view command to the server 100, the server 100 transmits the result view command to the control module 200, and the projector 400 may project a result view GUI onto the putting field 600 through the control module 200.

Figure 6:
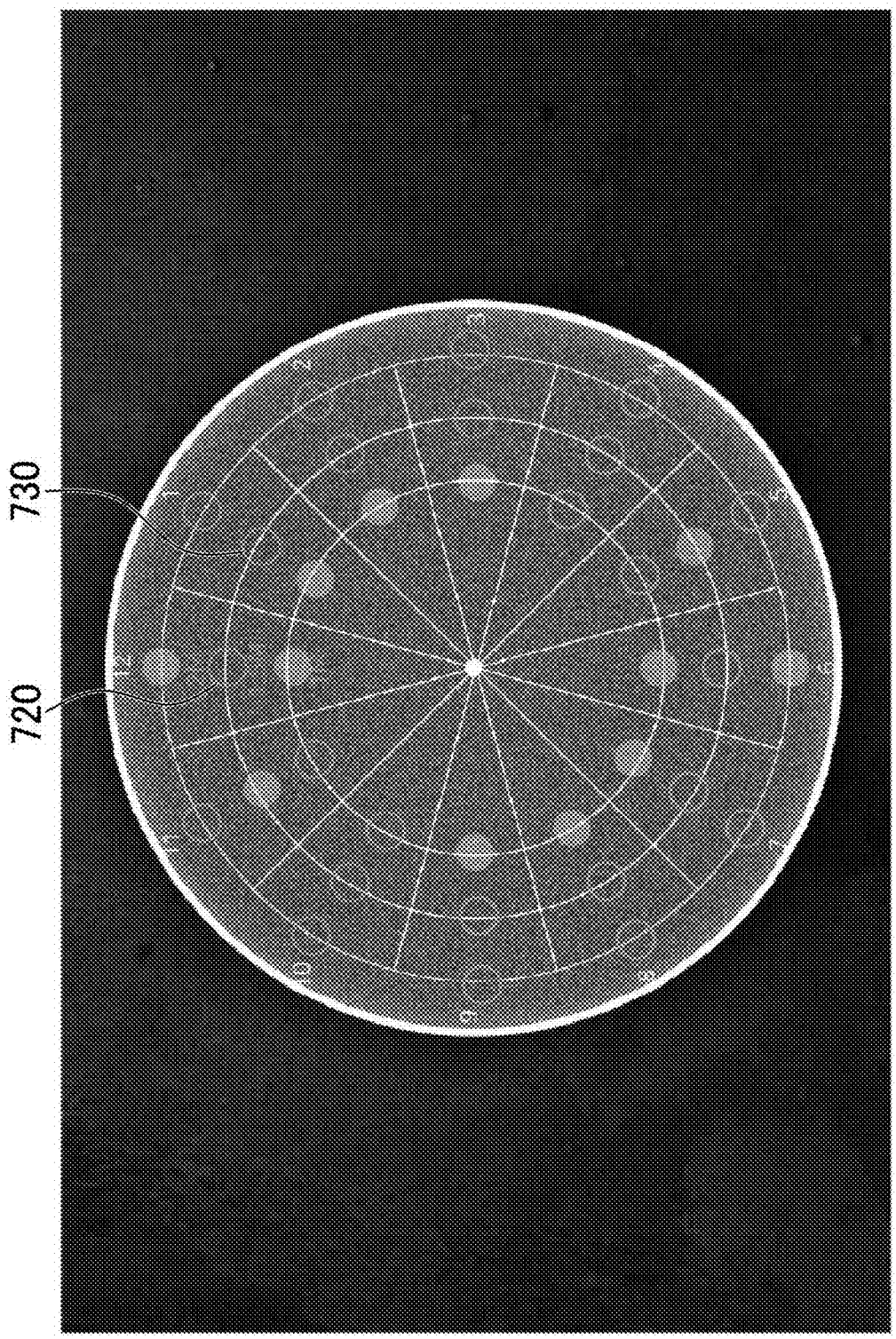
FIG. 6 is an example view of a putting success identifier and a putting failure identifier according to an embodiment of the present disclosure.

Referring to FIG. 6, the result view GUI includes putting section images obtained by equally dividing the putting field 600 for each angle and dividing into different lengths depending on distances from a hole cup. The putting section images may be implemented like a dart board shape as illustrated in FIG. 6, but this is simply an example and the putting section images are not limited thereto. In addition, a putting success identifier 720 and a putting failure identifier 730 are displayed in each putting section image.

The user terminal 500 may transmit information on the putting success identifier 720 and the putting failure identifier 730 to the control module 200, and the control module 200 may project the putting success identifier 720 and the putting failure identifier 730 onto the putting field 600 through the projector 400.

Hereinafter, a training mode according to an embodiment of the present disclosure will be described in detail.

When a user selects a training item, a ball position designation interface, a point, an aim point, an aim line, and a putting line interface may be provided on a user terminal.

The point indicates a position to which an actually putt golf ball has to reach and may be optionally set by a user and may be provided on a putting field GUI and the putting field 600.

The aim point indicates a position that has to be aimed to stop the putted golf ball at a position of the point and may be provided on the putting field GUI and the putting field 600.

The aim line is a straight line connecting a position of a golf ball to the aim point and may be provided on the putting field GUI and the putting field 600.

In this case, the operation of the control module 200 is performed in the same way as the function of the control module 200 described above, and thus, descriptions thereof are omitted without being repeated.

Figure 7:
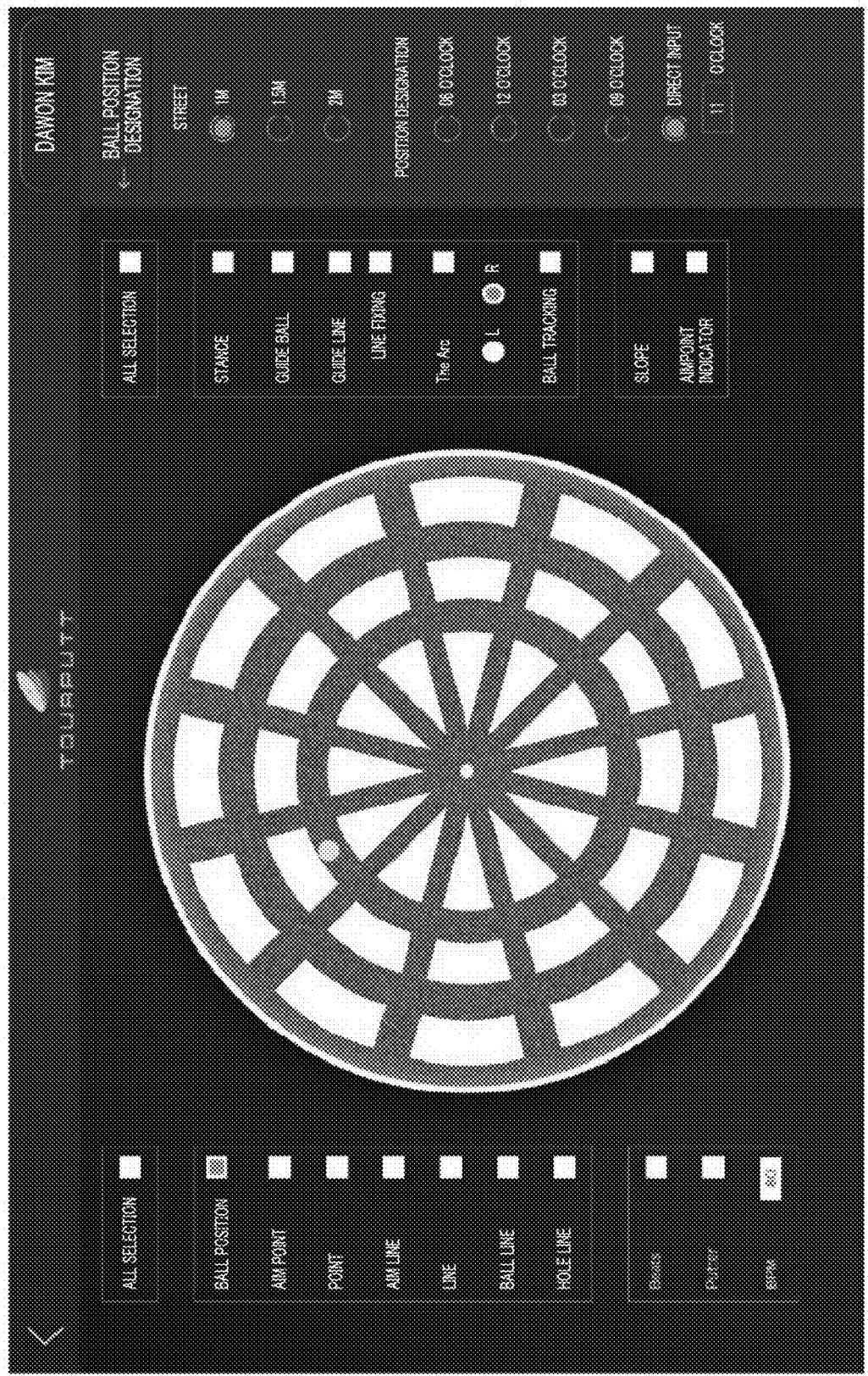
FIG. 7 is an example view of a ball position designation interface according to an embodiment of the present disclosure.

Referring to FIG. 7, the ball position designation interface may provide a putting field image region and a ball position setting region.

The putting field image region may have a shape in which divided polygons are displayed on a green background and respective putting fields are equally divided.

The ball position setting region is located between the divided polygons and sets a position of a golf ball to be placed on the putting field 600.

In this case, the user terminal 500 provides the set ball position setting region to the projector 400, and the set ball position setting region received by the projector 400 is projected onto the putting field 600.

A user may locate the golf ball in a position according to the projected region.

In the aimpoint interface, after the ball position designation interface, the user terminal 500 automatically recommends the aimpoint according to an algorithm thereof and provides the aimpoint to the projector 400, and the projector 400 projects the received preset aimpoint onto the putting field 600.

The putting line interface provides a putting line. The putting line indicates a line connecting the aim point to a position of a golf ball. The putting line may be reset in another direction by a user. When the user terminal 500 receives the reset condition for the putting line, the putting line is provided to the user terminal 500 and displayed, and the control module 200 provides a preset putting line to the projector 400, and thus, a preset line image may be projected onto the putting field 600.

The ball position, the aim point, and the putting line, which are described above, may all be displayed on a user terminal and a putting field, and when the setting therefor is completed, a user may hit a golf ball, and a control module may track a trajectory of the golf ball. In this case, the operation of the control module 200 is performed in the same way as the function of the control module 200 described above, and thus, descriptions thereof are omitted without being repeated.

Hereinafter, a statistical user interface related to a user's putting result will be described in detail.

When a user selects a statistical item on a menu screen, the user terminal 500 selects member information and a training period and transmits the member information and the training period to the server 100, and the server 100 may collect and analyze information on a putting result performed by the user during a corresponding period with reference to user identification information and training period and display a statistical UI including the member's training data analysis data on the user terminal 500.

Figure 8:
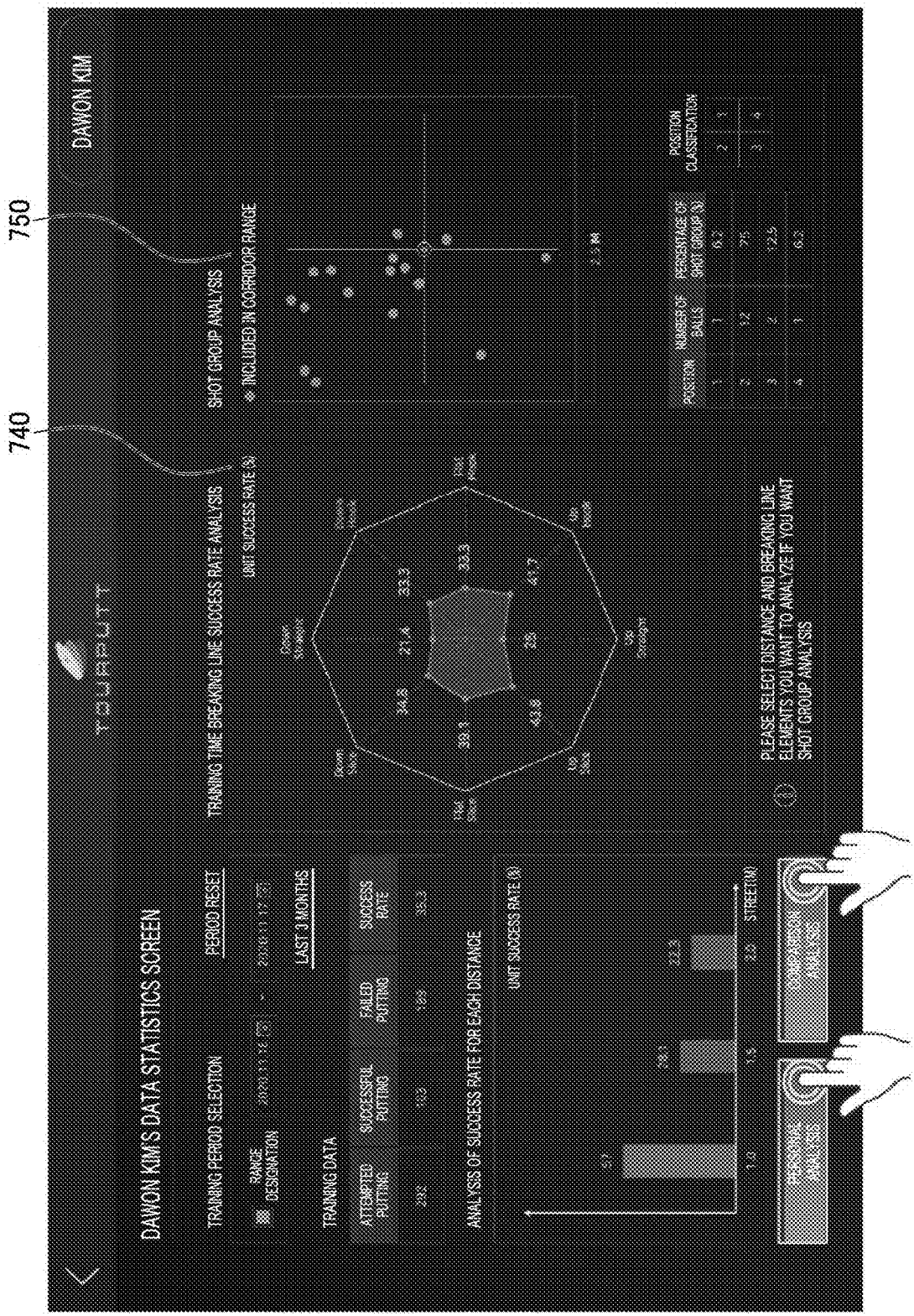
FIG. 8 is an example view illustrating a statistical user interface (UI) according to an embodiment of the present disclosure.

Referring to FIG. 8, the statistical UI may include a training period, training data on a success rate, success rate analysis information for each distance, a training time breaking line success rate analysis table 740, and a shot group analysis table 750, and may move to a personal analysis screen that additionally provides analysis on a user's putting tendency through a personal analysis button.

In the training time breaking line success rate analysis table 740, a two-dimensional plane is divided into eight regional regions according to a position where putting is performed, and a success rate for each region is provided in the form of a graph. An x axis of the graph denotes date and a y axis of the graph denotes the success rate, and respective sections are indicated by different lines, and a section success rate for each conditional date may be analyzed and provided in the form of a graph.

In the shot group analysis table 750, a position where a putted ball stops may be provided in two-dimensional coordinates, and the x axis and they axis divide a putting field into 1, 2, 3, and 4 quadrants to mark a position where a ball stops in each quadrant, and a scale of the shot group analysis table 750 may be set based on a ball stops at the farthest among positions where the displayed putt-failed ball stops.

When putting a golf ball placed in a certain position toward a hole cup, a putting angle that has to be putted to get the ball into the hole cup is called a corridor range, which is defined as an angle difference range based on a straight line connecting a certain position where a golf ball is placed to a hole cup.

Whether or not a user's putting is outside the corridor range is determined according to an own algorithm, and putting outside the corridor range may be displayed as a gray circle, and putting that does not exceed the corridor range may be displayed as a blue circle.

Figure 9:
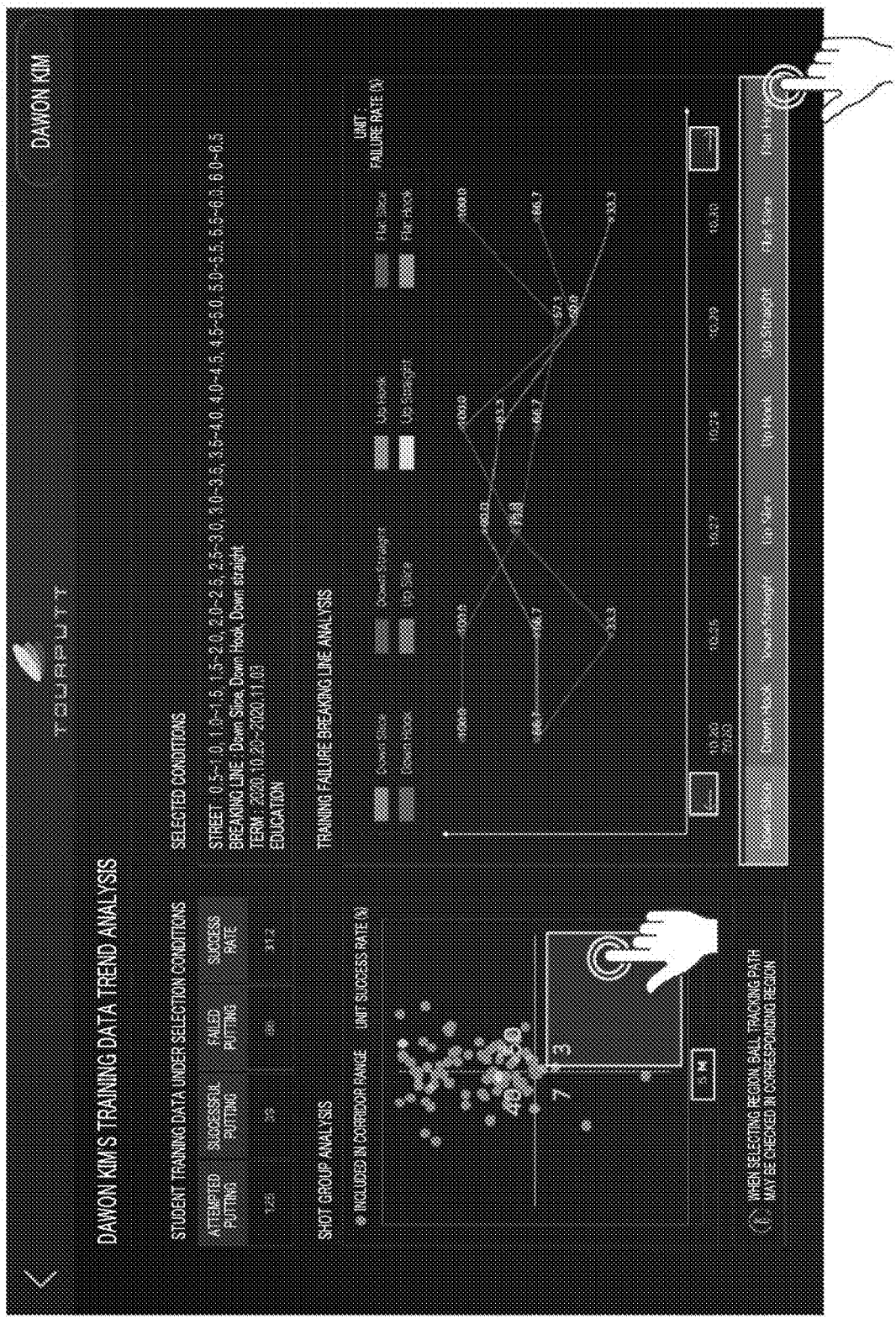
FIG. 9 is an example view illustrating breaking line analysis when training fails, according to an embodiment of the present disclosure.

Referring to FIG. 9, the personal analysis screen may include a trainee training data table in a selection condition, the shot group analysis table 750, and a training failure time breaking line analysis table.

The element that prevents a golf ball from proceeding in an intended direction when putting on a sloped terrain or a terrain that makes an uphill look a downhill by causing an optical illusion on the green of an actual golf game is called a brake, and a braking line is made by arbitrarily mimicking the brake on the putting field 600.

In the training failure time breaking line analysis table, a two-dimensional plane is divided into eight regions according to a position of putting, and a failure rate for each putting corresponding region is provided in the form of a graph for each region.

In this case, the training failure time breaking line analysis table is divided into stages according to eight preset breaks, and colors are different for each breaking line, and success rates for each date and each breaking line may be provided in the form of a line graph.

An x axis of the graph denotes date, and a y axis denotes a failure rate, and respective sections are indicated by different lines, and a section failure rate for conditional date may be analyzed and provided in the form of a graph.

Figure 10:
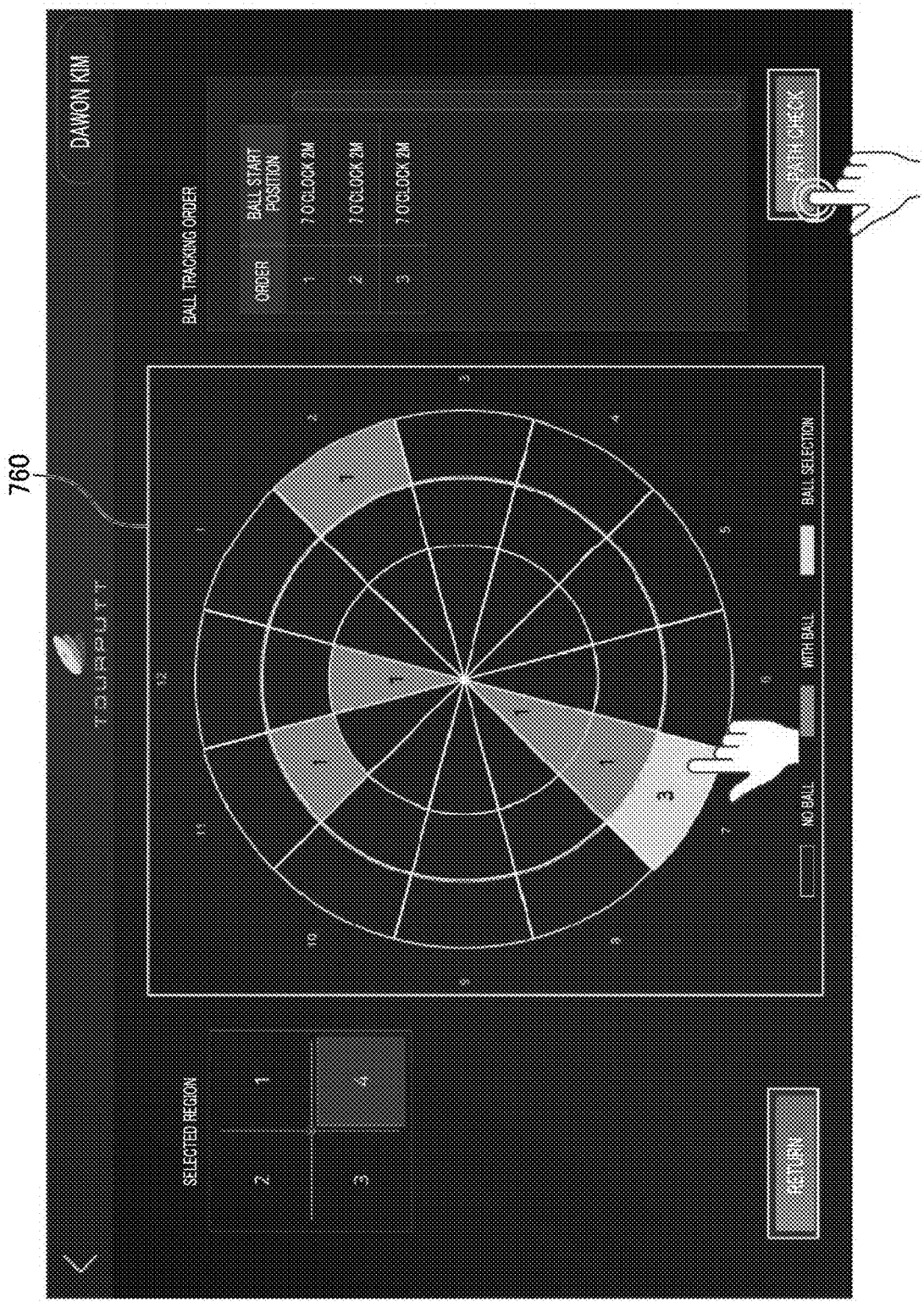
FIG. 10 is an example view illustrating a shot group ball tracking UI according to another embodiment of the present disclosure.

Meanwhile, when any one quadrant is selected from the shot group analysis table 750 of FIG. 9, a shot group ball tracking UI illustrated in FIG. 10 may be displayed.

Hereinafter, the shot group ball tracking UI will be described in detail with reference to FIG. 10.

The shot group ball tracking UI may provide a selected region, a selected-region ball information display image 760, a ball tracking order, and a path check button.

When a region is selected from the selected-region ball information display image 760, the selected region is displayed in yellow, the putting performed in the selected region is added to the ball tracking order, and when the path check button is pressed, a ball tracking image may be provided to the user terminal 500 and the putting field 600 in an order added to the ball tracking order.

In the ball tracking image, a trajectory of a golf ball putted in the corresponding position according to the order included in the ball tracking order by selecting the path check button may be provided to the putting field GUI of the putting interface, and the user terminal 500 may transmit the trajectory of the golf ball to the control module 200, and the control module 200 may project the trajectory of the golf ball to the putting field 600 through the projector 400.

Figure 11:
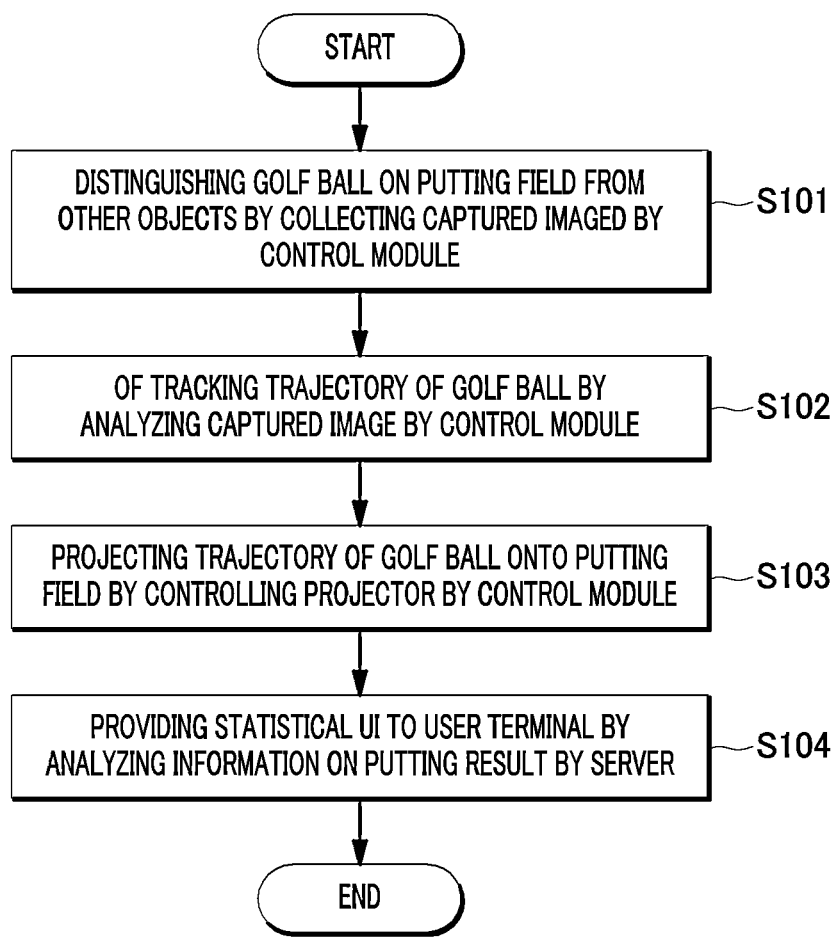
FIG. 11 is an operation flowchart of a putting guide system, according to an embodiment of the present disclosure.

Referring to FIG. 11, an operation order of a method of providing a putting guide system according to an embodiment of the present disclosure will be described.

The control module 200 sets an image of the putting field 600 received from the camera 300 before a user enters a putting room as a reference image, collects images captured thereafter, and distinguishes the golf ball on the putting field 600 from other objects (S101).

In this case, the control module 200 may mask a portion other than the portion determined to be a golf ball on the image.

The control module 200 tracks a trajectory of a golf ball putted by a user by analyzing captured images received from the camera 300 in real time (S102).

In this case, the control module 200 may determine whether to continue tracking the golf ball or to stop the tracking by calculating a feature vector of the golf ball.

The control module 200 controls the projector 400 to project the trajectory of the golf ball onto the putting field 600 (S103).

In this case, the trajectory of the golf ball may be generated and provided by the projection image generation unit 240 of the control module 200.

The server 100 may provide a statistical UI to the user terminal 500 by analyzing information on a putting result provided from the control module 200 (S104).

Hereinafter, a method of providing physical property information of a putting environment utilized in a putting guide system, according to an embodiment of the present disclosure will be described.

In the construction of physical property information described below, the control module 200 may set the image of the putting field 600 received from the camera 300 before the user enters the putting room as a reference image and may be performed prior to performing the operation S101 of collecting the captured images to distinguish the golf ball from other objects on the putting field 600.

According to another embodiment of the present disclosure, the control module 200 may also include the server 100 installed in a facility where the method of providing physical property information of a putting environment utilized in a putting guide system is performed or may also include a cloud server that may be connected to the server 100 by wire or wireless to communicate with the server 100.

The camera 300 according to another embodiment of the present disclosure may be located in a place where the camera 300 may capture images of an upper portion of one side of a ceiling or an upper portion of one side of a wall of a facility (hereinafter, a putting room) in which the method of providing physical property information of the putting environment utilized in the putting guide system is performed, or the whole of the putting room, or the whole of the putting field 600 in order to capture an image of the putting field 600 or the putting room.

In addition, the camera 300 may include a three-dimensional (3D) scan function in addition to the image capturing function and may include a plurality of lenses to measure a depth and a height of a target object by using a distance between the plurality of lenses.

According to another embodiment of the present disclosure, when a plurality of projectors 400 are installed to project and display images on the putting field 600, the respective projectors 400 project different images or videos so as to overlap each other or so as not to overlap each other, and thus, a selection width of the images or videos displayed on the putting field 600 may be diversified.

First, the control module 200 collects 3D data for the putting field 600 by capturing an image of the putting field 600 through the camera 300.

In this case, the camera 300 provides the control module 200 with the 3D data obtained by measuring the putting field 600 for each preset height unit.

Figure 12A:
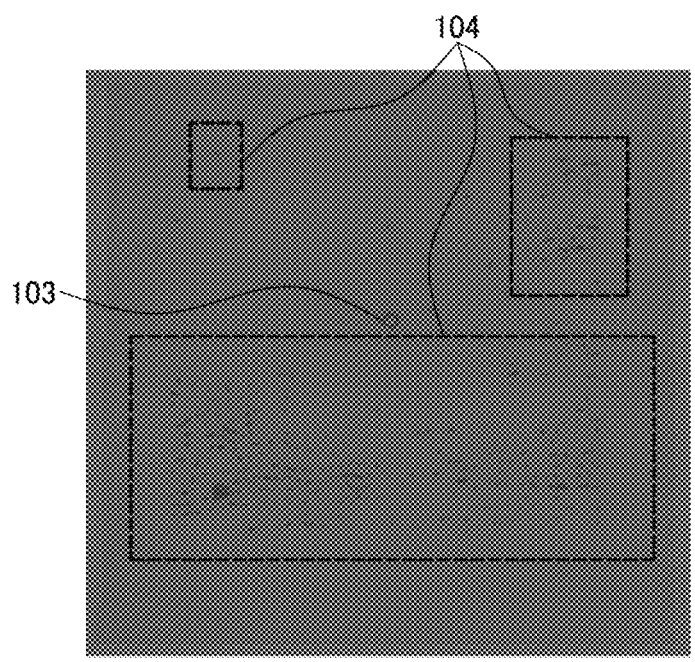
FIG. 12A is an example diagram illustrating three-dimensional (3D) putting field data received from a 3D scanning device, according to an embodiment of the present disclosure.

Referring to FIG. 12A, after receiving the 3D data, the control module 200 recognizes an object based on an HSV value and a size of the object, and determines whether the recognized object deviates from a surrounding inclination.

When it is determined that the recognized object deviates from the surrounding inclination, the recognized object is displayed on the 3D data for the putting field 600 so as to appears in a certain color.

Figure 12B:
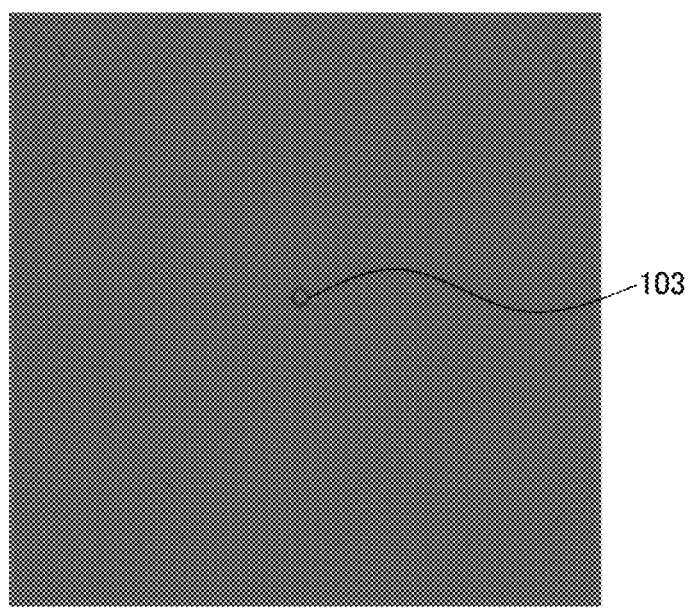
FIG. 12B is an example diagram illustrating corrected 3D putting field data according to an embodiment of the present disclosure.

Next, the control module 200 generates corrected 3D data by performing noise filtering based on a Gaussian filter and the surrounding inclination with reference to FIG. 12B.

Through this, the control module 200 may distinguish a 3D data golf ball 103 and a part other than the golf ball (noise 104) from the 3D data as illustrated in FIG. 12B, and by perform noise filtering to obtain 3D data in which only the golf ball remains.

The 3D data corrected through the process described above may be data for identifying only a position and a size of an actual golf ball 1 on the putting field 600, and according to another embodiment of the present disclosure, the corrected 3D data may remove noise 104 for the 3D data hole cup (not illustrated) and a user (a putting player) in addition to the golf ball.

Figure 13:
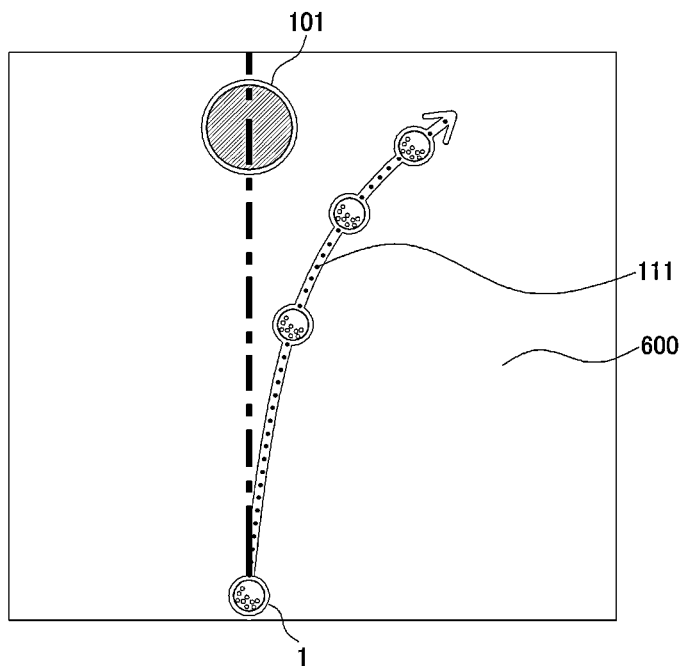
FIG. 13 is an example view illustrating an actual putting field, a hole cup, and a trajectory of a golf ball according to an embodiment of the present disclosure.

Referring to FIG. 13, the control module 200 may collect user putting data obtained when a plurality of users perform a plurality of times of putting in the putting field 600.

The collection of the user putting data which are described below may performed simultaneously with operation S102 of tracking a trajectory of a golf ball putted by a user by analyzing the captured image received in real time from the camera 300 by using the control module 200.

The user putting data according to an embodiment of the present disclosure is data collected every time each user performs putting on the putting field 600 and may be configured in the form of corrected 3D data and may include an actual coordinate value of the golf ball 1, a corridor range, an actual speed of the golf ball 1, a putting time, and user identification information.

In this case, the corridor range according to an embodiment of the present disclosure indicates a putting angle at which a golf ball placed in a certain position has to be putted to enter a hole cup when putted toward the hole cup and may be defined as an angle difference range based on a straight line connecting the certain position in which the golf ball is placed to the hole cup.

For example, as illustrated in FIG. 13, when a golf ball putted by a user actually deviates from the hole cup 101, the user putting data for the corresponding putting may indicate that the putting is not made within the corridor angle by the control module 200.

Meanwhile, when the putting performed by the user actually hits the hole cup 101, the user putting data for the corresponding putting may indicate that the putting is not made within the corridor angle.

Next, the control module 200 loads the 3D data for the putting field 600 into a preset simulation program, and then may determine a physical property value of the putting field 600 while performing multiple times a simulation for a case in which putting is made on the putting field 600 by applying the user putting data.

The simulation program according to an embodiment of the present disclosure may be a physical engine software implemented to apply a physical law of the real world to virtual reality in the same way.

The control module 200 extracts, from the user putting data, putting start data including a position of a golf ball, a hitting direction, and a hitting force, and putting result data including a trajectory of the golf ball and whether the golf ball is in a hole cup.

In the present embodiment, the hitting force may be derived by calculating an initial velocity at the time of putting with reference to a position value for each time period after actual hitting of the golf ball 1.

Figure 14:
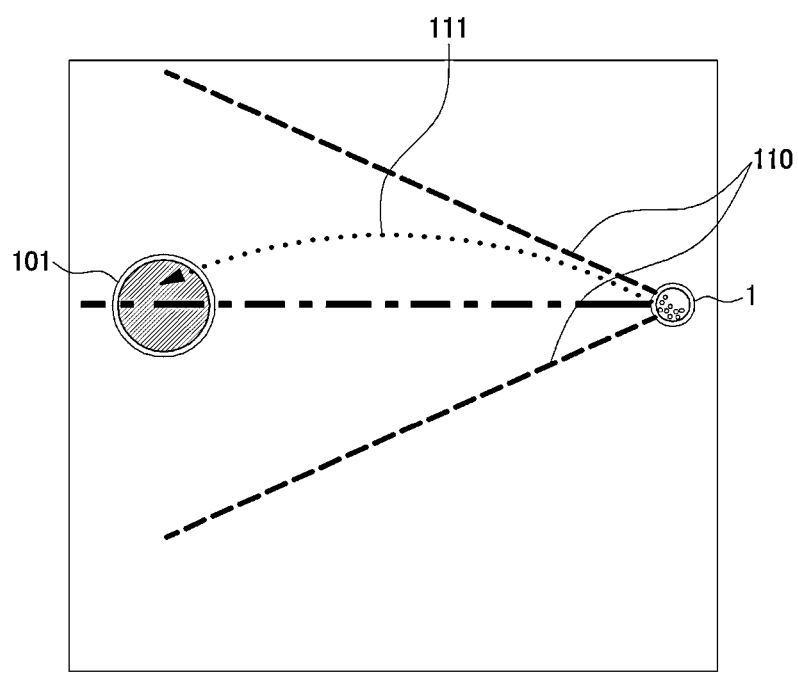
FIG. 14 is an example view illustrating a corridor and a putting line calculated as a result of a simulation according to an embodiment of the present disclosure.

Referring to FIG. 14, a physical property value of a simulation program may be adjusted such that the putting start data of the extracted user putting data is input to the simulation program described above and putting result data corresponding thereto is output.

In this case, the physical property value includes a friction force and inclination of the putting field 600, and, for example, when putting made in the actual putting field 600 is different from putting made in the simulation program, the physical property value corresponding to the user putting data may be adjusted to such that the same result value as the actual putting made in the putting field 600 is derived. In this case, the friction force and the inclination of the putting field 600 may also be set differently for each local region in the putting field 600.

In other words, even when a plurality of actual physical phenomena affecting a movement of a golf ball are not all reflected in the simulation program, a physical property value capable of reproducing the same movement as the actual movement of the golf ball 1 may be calculated according to the adjusted physical property value, and thus, the control module 200 may calculate how a user has to hit a golf ball.

Thereafter, when receiving an image of the actual golf ball 1 placed at a certain position on the putting field 600 from the camera 300, the control module 200 may project a corridor angle calculated through the simulation and the putting line 110 onto the putting field 600 through the projector 400 so as to be displayed thereon in order to guide hitting of a golf ball based on the physical property value of the putting field 600 determined through the process described above.

An operation of projecting information for guiding the hitting to the putting field 600 may be performed with operation S103 of projecting a trajectory of a golf ball onto the putting field 600 under the control of the projector 400 controlled by the control module 200.

When a value for a position of a golf ball is input to the 3D data received from the camera 300, that is, before hitting is made, while a golf ball is located at a predetermined position and waits for hitting from a user, a simulation is performed a plurality of times while variously changing values for a hitting direction and a hitting force for the 3D data golf ball 103, and thus, the greatest range and a smallest range of a putting angle and an ideal putting angle may be derived.

In this case, the ideal putting angle may be an average value of the greatest range and the smallest range of the putting angle, and according to another embodiment of the present disclosure, the ideal putting angle may be the most successful putting angle among the user putting data collected within the greatest range and the smallest range.

That is, the control module 200 according to an embodiment of the present disclosure may perform a simulation by inputting a value for a position of a golf ball in an image to a simulation program, and then may find a trajectory for the golf ball to enter a hole cup and may display a putting line based on the trajectory on the putting field 600.

The putting line displayed on the putting field 600 may be displayed on the putting field 600 as a straight line corresponding to each of the greatest putting angle, the smallest putting angle, and the ideal putting angle, and according to another embodiment of the present disclosure, each putting line or at least one putting line may indicate an actual golf ball trajectory 111 displayed as a curved line or a straight line.

Thereafter, the control module 200 may update a preset physical property value by repeating the simulation and collection of information on user's putting every preset period.

The physical property value (physical environment) of the putting field 600 may change over time. For example, when users step on or use the putting field 600 too much, a friction force or an inclination value may vary slightly, or properties of the turf change according to a change of season, and the frictional force or the inclination value may vary due to these factors. Accordingly, even when the physical property value of the putting field 600 is initially determined, it is necessary to continuously update the physical property value on the assumption that the physical property value may change over time. For example, the physical property value may be updated once a month or once a quarter.

When updating is performed, the user putting data performed by user on the putting field 600 in the meantime is collected, putting start data is extracted therefrom, and then a simulation is performed to determine whether the existing simulation prediction result corresponds to the putting result data, and thus, it may be determined whether there is a change in the physical property value of the putting field 600. When it is determined that there is a change in the physical property value, the updated physical property value may be found by performing the simulation process described above again based on the user putting data.

Hereinafter, a procedure of the method of providing physical property information of a putting environment utilized in a putting guide system, according to an embodiment of the present disclosure will be described with reference to FIG. 15.

The control module 200 collects 3D data for the putting field 600 by capturing an image of the putting field 600 through the camera 300 (S201).

At least one user in the putting field 600 collects user putting data performed a plurality of times (S202).

The control module 200 loads the 3D data for the putting field 600 into a preset simulation program, then performs a simulation for a case in which putting is performed on the virtual putting field 600 a plurality of times by applying the user putting data, thereby determining a physical property value of the virtual putting field 600 (S203).

After that, when receiving an image in which a golf ball is placed in a certain position on the putting field 600 from the camera 300, a putting line for guiding hitting of the actual golf ball 1 is displayed on the actual putting field 600 through the projector 400, based on the determined physical property value of the putting field 600 (S204).

An embodiment of the present disclosure may also be implemented in the form of a recording medium including instructions executable by a computer such as a program module executed by the computer. A computer-readable medium may be any available medium that may be accessed by a computer and include all of volatile and nonvolatile media and removable and non-removable media. In addition, the computer-readable medium may include a computer storage medium. The computer storage medium includes all of volatile and nonvolatile media and removable and non-removable media implemented by any method or technology for storing information such as computer readable instructions, data structures, program modules or other data.

Although the method and system of the present disclosure are described with reference to specific embodiments, some or all of their components or operations may be implemented by using a computer system having a general-purpose hardware architecture.

The above description of the present disclosure is for illustration, and those skilled in the art to which the present disclosure belongs will be able to understand that it may be easily modified into other specific forms without changing the technical idea or essential features of the present disclosure. Therefore, it should be understood that the embodiments described above are illustrative in all respects and not restrictive. For example, each component described as a single type may be implemented in a distributed form, and likewise components described as distributed may be implemented in a combined form.

The scope of the present disclosure is indicated by the following claims rather than the above detailed description, and all changes or modifications derived from the meaning and scope of the claims and their equivalent concepts should be interpreted as being included in the scope of the present disclosure.

The present disclosure is to solve the problems of the related art described above and is implemented in a simulated putting field of a putting room provided indoors and may give a feeling of putting practice in an actual golf field without going out to the actual golf field.

In addition, in performing the putting practice, ae control module may provide a putting guide image to a putting field and a user terminal through a projector, thereby making the putting practice, which may be boring, interesting.

In addition, it is possible to provide statistics composed of numerical data regarding the putting practice performed in the putting field, and to provide a reliable putting improvement direction to a user therethrough.

Furthermore, by collecting information on putting that a plurality of users performed before or will perform in the future and utilizing the information to update a virtual putting environment, various users' putting actions, habits, and improvement points may be identified and displayed on a putting field, and the users may be provided with statistical data on their putting mechanism, habits, weaknesses, and so on, and thus, the users may easily set a direction for improvement.

What is claimed is:

1. A method of providing a putting guide system, the method comprising:
   (a) distinguishing a golf ball on a putting field from other objects by collecting images captured by a camera by a control module;
   (b) tracking a trajectory of the golf ball by analyzing the collected images by the control module when a user hits the golf ball; and
   (c) projecting the trajectory of the golf ball onto the putting field for a user to view the trajectory under a control of a projector controlled by the control module,
   wherein the putting guide system comprises at least one projector installed in an upper portion of a putting room including a floor surface composed of the putting field and capable of projecting an image onto the putting field, the camera located in the upper portion of the putting room near the at least one projector to capture the image of the putting field, the control module for providing physical property information of a putting environment based on the image provided from the camera to be analyzed and for controlling the projector, a server connected to the control module by wire/wireless to analyze a putting result and statistics and providing the analyzed result to a user terminal, and the user terminal for controlling the control module through a putting interface received from the server to perform a putting training program wherein the step (a) comprises:
   (a+1) identifying a difference by comparing a reference image, which is captured by the camera before the user enters the putting room, for the putting field with the captured images when the golf ball is placed on the putting field, and comparing images from the camera at different times after the golf ball hit until it stops to recognize parts different from a previous image on the received image based on a color and a size;
   (a+2) distinguishing hit golf ball from a person and an object other than the hit golf ball; and
   (a+3) checking a region other than the golf ball
   wherein, in the step (a+2),
   when a plurality of objects having a color corresponding to a color of the hit golf ball are recognized in the image captured in real time, the control module distinguishes the hit golf ball based on a color, a size of the recognized object, and a movement of the recognized object, and when it is determined that the size of the object is greater than a preset size or the movement of the recognized object is different from a physical movement pattern in which the hit golf ball is movable, the control module recognizes that the recognized object is at least one of a person's shoes, hat, and clothing and determines that the recognized object is not the hit golf ball.

2. The method of claim 1, wherein, in the step (a+3), the golf ball is distinguished from the region other than the golf ball by collectively masking the rest other than the golf ball in a color or pattern distinguished from the golf ball.

3. The method of claim 1, wherein, in the step (b), when the user hits the golf ball, the control module compares the images received from the camera for each time period, calculates a feature vector including a movement direction and a speed of the golf ball, predicts the trajectory of the golf ball by calculating change values for each time period of the feature vector, determines whether the golf ball enters a hole cup based on the predicted trajectory, and determines whether to continuously track the trajectory of the golf ball in a path through which the golf ball passes by the hole cup when the golf ball approaches the hole cup and the golf ball overlaps the hole cup overlap each other to be identified as one object having one color in the captured image.

4. The method of claim 1, wherein, in the step (c), a trajectory image of the golf ball is projected onto the putting field in real time after the step (b), or when there is an input from the user terminal after the step (b), the trajectory image of the golf ball is projected onto the putting field.

5. The method of claim 1, further comprising:
   (a-1) providing, to the user terminal, a pattern test UI that enables putting training and result check for each of a plurality of regions constituting a putting guide image displayed on the putting field before the step (a);

(a-2) providing, to the user terminal, a training UI that enables putting and the result check by causing the user to optionally set a position and an aim point of the golf ball before the step (a);

(a-3) displaying a position where the golf ball is placed on the putting field under the control of the control module according to an input from a user terminal, between the step (a-1) and the step (a); and (a-4) providing a pattern test result view user interface after the step (a) to the step (c) are performed.

6. The method of claim 5, wherein the step (a-1) further comprises inputting a pattern test condition including starting point determining, distance order determining, direction order determining, and stroke limit time setting.

7. The method of claim 5, wherein the pattern test result view user interface is configured by including a success rate display image that has a form of a dart board and is composed of shapes and colors that is easily identifiable by using green and red which are complementary to each other and includes division information of the putting field to display a training result, and a training result table provided in a form of a list including a date, attempted putting, unsuccessful putting, and a success rate, on the right side of the success rate display image; and a result view button.

8. The method of claim 7, wherein a result view GUI is displayed when clicking the result view button and includes putting section images obtained by equally dividing the putting field for each angle and dividing into different lengths depending on distances from a hole cup, a putting success identifier and a putting failure identifier are displayed in the respective putting section images, the user terminal transmits information on the putting success identifier and the putting failure identifier to the control module, the control module projects the putting success identifier and the putting failure identifier onto the putting field through the projector, the putting failure identifier and the putting success identifier are configured in different shapes, and when the putting failure identifier and the putting success identifier are clicked, a putting trajectory of corresponding putting is simultaneously provided to the putting field and the putting field image on the user terminal through the user terminal and the projector by the control module.

9. The method of claim 5, wherein
the training UI includes a ball position designation interface, an aimpoint interface, and a putting line interface, and
the aim point indicates a position at which the user looks at a target point to put the golf ball into a hole cup, and a putting line connects the aim point to a current position of the golf ball and is resettable in a different direction by the user.

10. The method of claim 9, wherein
the ball position designation interface includes a putting field image region and a ball position setting region, the putting field image region has a shape in which divided polygons are displayed on a green background, respective putting fields are equally divided, the ball position setting region is located between the divided polygons and sets a position of the golf ball to be placed on the putting field, and the ball position designation region set by the control module is projected onto the putting field through the projector,
the aimpoint interface indicates that the control module automatically displays the aim point on the putting field image according to own algorithm after the ball position designation interface, and
the putting line interface provides the putting line to project a preset line image on the putting field.

11. The method of claim 1, wherein
in the training time breaking line success rate analysis table, a two-dimensional plane is divided into eight regional regions according to a position where putting is performed, and a success rate for each region is provided in a form of a graph, an x axis of the graph denotes date, a y axis of the graph denotes the success rate, respective sections are indicated by different lines, the section success rate for each conditional date are analyzed and provided in the form of the graph, the breaking line is divided into eight stages according to inclination, and the success rate for each date and each breaking line is provided in a form of a line graph by different colors for each breaking line,
a shot group analysis table provides a position in which the golf ball stops after the putting, as two-dimensional coordinates, and an x axis and a y axis divide the putting field into 1, 2, 3, and 4 quadrants to indicate the position in which the golf ball stops in each quadrant,
a size of the putting field is set based on the golf ball stopped at the farthest place among the displayed positions in which putting-failed golf balls stop in the shot group analysis table,
a color of the golf ball hit within a corridor range and a color of the golf ball hit outside the corridor range are distinguished from each other and displayed on two-dimensional coordinates,
the corridor refers to a putting angle at which the golf ball has to be putted to enter a hole cup when putting is performed toward the hole cup at a position, When an identification mark indicating the golf ball in the shot group analysis table is input by the user, a shot group ball tracking UI is provided, and the identification mark indicating a golf ball selected by the user provides a selection region indicating a quadrant located in the shot group analysis table, a selection region ball information display image, and a path check button, and
when the path check button is clicked, the trajectory of the golf ball of putting performed at a position corresponding to the identification mark indicating the golf ball selected by the user is provided on the user terminal and the putting field.

12. The method of claim 1, wherein
a putting section image obtained by dividing the putting field into a plurality of sections equally for each angle around a hole cup is displayed by the projector,
a putting success rate of each section is provided to the user terminal after the user performs putting for each section, and at least two or more sections among the plurality of sections have different inclinations, and
position information after putting of the golf ball hit through the user terminal is provided as an image in a form of a map after the user performs putting, and when the putting is performed toward the hole cup from a position, information on whether the golf ball is hit within a corridor range is identified in the image in the form of the map according to the corridor range which is a putting angle range for putting the ball into the hole cup.

13. The method of claim 1, further comprising:
(e) generating a physical property information of a putting environment utilized in a putting guide system before the step (a), wherein the step (e) comprises:
(e-1) collecting, by the control module, 3D data for the putting field by capturing an image of the putting field through the camera;
(e-2) collecting, by the control module, user putting data performed a plurality of times by at least one user in the putting field; and
(e-3) loading the 3D data for the putting field into a preset simulation program by the control module, and then determining a physical property value of the putting field while performing a simulation a plurality of times, when the putting is performed on the putting field by applying the user putting data;
wherein the step (a) comprises displaying a putting line for guiding hitting of the golf ball on the putting field through the projector based on the determined physical property value of the putting field, when the control module receives an image of the golf ball placed at a position on the putting field from the camera, and
wherein the physical property value includes a friction force and inclination of the putting field.

14. The method of claim 13, wherein, in the step (e-1), the camera provides the 3D data obtained by capturing images of the putting field for each preset height unit to the control module,
an object is recognized based on an HSV value and a size of the object after the 3D data is provided, and when the recognized object is determined to deviated from a surrounding inclination, a mark is displayed on the 3D data for the putting field to display the recognized object in a different color on the 3D data,
the 3D data is corrected by performing noise filtering based on a Gaussian filter and the surrounding inclination, and the corrected 3D data is for identifying only a position and a size of the golf ball on the putting field,
the user putting data is data collected every time each user performs putting on the putting field and is configured in a form of the corrected 3D data and includes coordinate values of the golf ball, a corridor range, a speed of the golf ball, a putting time, and user identification information, and
the simulation program is physical engine software implemented to equally apply a physical law of a real world to virtual reality.

15. The method of claim 13, wherein the step (e-3) comprises:
extracting, from the user putting data, putting start data including a position of the golf ball, a hitting direction, and a hitting force, and putting result data including the trajectory of the golf ball and whether the golf ball is put in a hole cup; and
adjusting the physical property value of the simulation program to output corresponding putting result data when the putting start data of the user putting data is input to the simulation program,
wherein the hitting force is derived by calculating an initial velocity at the time of performing the putting with reference to position values for each time period after the golf ball is hit.

16. The method of claim 13, wherein
the step (e-4) comprises updating the determined physical property value by repeating the step (a) to the step (c) every preset period and deriving greatest and smallest ranges of a putting angle and an ideal putting angle by performing the simulation multiple times while variously changing values for a hitting direction and a hitting force when a value for a position of the golf ball is input,
a simulation is performed by inputting the value for the position of the golf ball in the image to the simulation program and then a trajectory for the golf ball to enter a hole cup is found, and the putting line is displayed on the putting field based on the trajectory, the ideal putting angle is an average value of the greatest and smallest ranges of the putting angle, and
the putting line corresponding to each of a greatest putting angle, a smallest putting angle, and an ideal putting angle on the putting field is displayed on the putting field.

17. A putting guide system server comprising:
a memory storing a program for performing a putting guide system and a method of providing physical property information utilized in the putting guide system; and
a processor configured to execute the program,
wherein the method comprises:
(a) distinguishing a golf ball on a putting field from other objects by collecting images captured by a camera by a control module;
(b) tracking a trajectory of the golf ball by analyzing the collected images by the control module when a user hits the golf ball;
(c) projecting the trajectory of the golf ball onto the putting field for a user to view the trajectory under a control of a projector controlled by the control module;
(d) transmitting member information and a training period to the server by a user terminal, and collecting and analyzing, by the server, information on a putting result performed by the user during a corresponding period with reference to user identification information and the training period, and providing the user terminal with statistical UI including training data related to the training period, a success rate, success rate analysis information for each distance, a training time breaking line success rate analysis table, and a shot group analysis table; and
(e) providing physical property information of a putting environment utilized in the putting guide system
wherein the step (a) comprises:
(a+1) identifying a difference by comparing a reference image, which is captured by the camera before the user enters a putting room, for the putting field with the captured images when the golf ball is placed on the putting field, and comparing images from the camera at different times after the golf ball hit until it stops to recognize parts different from a previous image on the received image based on a color and a size;
(a+2) distinguishing hit golf ball from a person and an object other than the hit golf ball; and
(a+3) checking a region other than the golf ball
wherein, in the step (a+2),
when a plurality of objects having a color corresponding to a color of the hit golf ball are recognized in the image captured in real time, the control module distinguishes the hit golf ball based on a color, a size of the recognized object, and a movement of the recognized object, and when it is determined that the size of the object is greater than a preset size or the movement of the recognized object is different from a physical movement pattern in which the hit golf ball is movable, the control module recognizes that the recognized object is at least one of a person's shoes, hat, and clothing and determines that the recognized object is not the hit golf ball.

* * * * *